United States Patent
Monteuuis et al.

(10) Patent No.: US 12,316,516 B2
(45) Date of Patent: May 27, 2025

(54) ERROR CORRECTION SYSTEM FOR A MISBEHAVIOR DETECTION SYSTEM

(71) Applicant: QUALCOMM Incorporated, San Diego, CA (US)

(72) Inventors: Jean-Philippe Monteuuis, Northborough, MA (US); Cong Chen, San Diego, CA (US); Jonathan Petit, Wenham, MA (US); Mohammad Raashid Ansari, Lowell, MA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/813,587

(22) Filed: Jul. 19, 2022

(65) Prior Publication Data
US 2024/0031259 A1  Jan. 25, 2024

(51) Int. Cl.
*H04L 43/06* (2022.01)
*H04W 28/06* (2009.01)

(52) U.S. Cl.
CPC .............. *H04L 43/06* (2013.01); *H04W 28/06* (2013.01)

(58) Field of Classification Search
CPC ................................ H04L 43/06; H04W 28/06
See application file for complete search history.

(56) References Cited

U.S. PATENT DOCUMENTS

| 2013/0262103 | A1* | 10/2013 | Reiswig | H04R 29/007 704/235 |
| 2017/0371349 | A1* | 12/2017 | Kim | G08G 1/096775 |
| 2020/0139980 | A1* | 5/2020 | Liu | B60W 30/12 |

OTHER PUBLICATIONS

International Search Report and Written Opinion—PCT/US2023/027210—ISA/EPO—Dec. 4, 2023.
Liu X., et al., "MISO-V: Misbehavior Detection for Collective Perception Services in Vehicular Communications", 2021 IEEE Intelligent Vehicles Symposium (IV), IEEE, Nagoya, Japan, Jul. 11, 2021, XP034005588, pp. 369-376, Section III.D.
Partial International Search Report—PCT/US2023/027210—ISA/EPO—Oct. 12, 2023.

* cited by examiner

*Primary Examiner* — Siming Liu
(74) *Attorney, Agent, or Firm* — Procopio, Cory, Hargreaves & Savitch

(57) ABSTRACT

A first UE may receive a V2X message from a second UE. The V2X message may be a suspicious message. The V2X message may include a plurality of values. Each value in the plurality of values may correspond to a respective field in a plurality of fields. The first UE may identify a health score associated with the V2X message. The first UE may adjust at least one value in the plurality of values if the health score is greater than a threshold. Accordingly, a health level of a suspicious V2X message may be analyzed quantitatively. A suspicious V2X message with a sufficiently low health level may be suppressed. Moreover, a correctable field value in a suspicious V2X message may be corrected based on a computed, measured, or prestored value.

19 Claims, 17 Drawing Sheets

ERROR CORRECTION SYSTEM FOR A MISBEHAVIOR DETECTION SYSTEM

TECHNICAL FIELD

The present disclosure relates generally to communication systems, and more particularly, to a misbehavior detection system in the context of vehicle-to-everything (V2X) communication in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Vehicle-to-everything (V2X) is communication between a vehicle and any entity that may affect, or may be affected by, the vehicle. V2X is a vehicular communication system that incorporates other more specific types of communication such as V2I (vehicle-to-infrastructure), V2N (vehicle-to-network), V2V (vehicle-to-vehicle), V2P (vehicle-to-pedestrian), or V2D (vehicle-to-device).

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may receive a V2X message from a second UE. The V2X message may be a suspicious message. The V2X message may include a plurality of values. Each value in the plurality of values may correspond to a respective field in a plurality of fields. The apparatus may identify a health score associated with the V2X message. The apparatus may adjust at least one value in the plurality of values if the health score is greater than a threshold.

In an aspect of the disclosure, a method, a computer-readable medium, and an apparatus are provided. The apparatus may be a UE. The apparatus may receive a plurality of first V2X messages and a second V2X message. The second V2X message may be subsequent to the plurality of first V2X messages. The apparatus may identify the second V2X message as being suspicious based on the plurality of first V2X messages. The second V2X message may be inconsistent with the plurality of first V2X messages based on forecasting from the plurality of first V2X messages. The apparatus may receive a plurality of third V2X messages. The plurality of third V2X messages may be subsequent to the second V2X message. The plurality of third V2X messages may be consistent with each other based on forecasting from at least some third V2X messages in the plurality of third V2X messages. The apparatus may reevaluate the second V2X message based on backcasting from the plurality of third V2X messages. The apparatus may generate a report associated with the second V2X message based on the reevaluation of the second V2X message.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
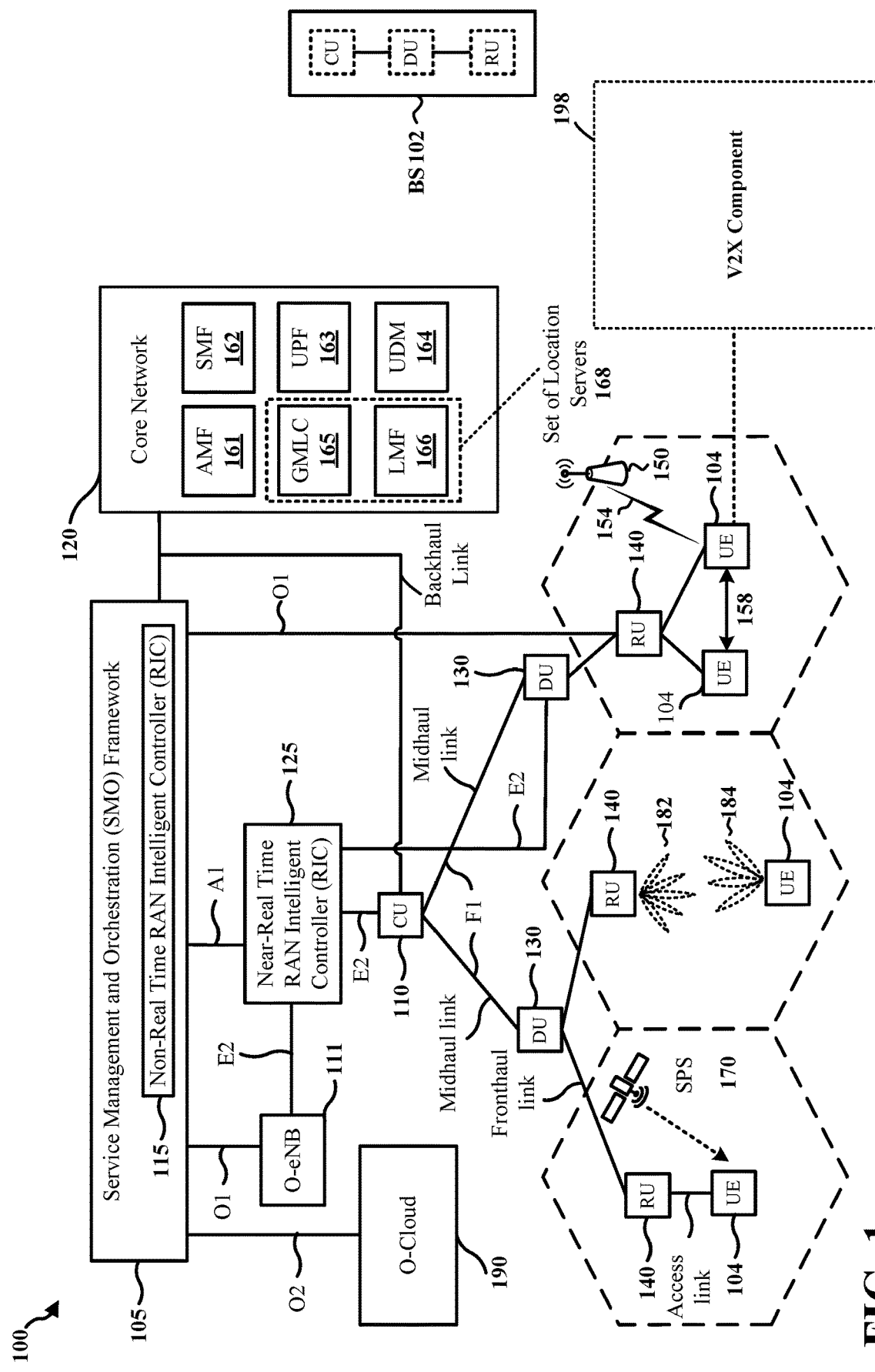
FIG. 1 is a diagram illustrating an example of a wireless communications system and an access network, in accordance with various aspects of the present disclosure.

A conventional V2X misbehavior detection system (MBDS) may not consider salvaging or correcting a suspicious V2X message, which may include valid information. Accordingly, one or more aspects may reduce the loss of valid information that may be carried in a suspicious V2X message. Further, one or more aspects may enable the correction of a genuineness assessment after an initial misbehavior detection based on forecast propagation alone. The correction may improve the quality of misbehavior detection. In particular, for a conventional V2X MBDS, an incorrect or implausible field value in a V2X message may lead to the suppression of the whole V2X message, resulting in loss of correct or valid data that may be carried in the V2X message. The conventional V2X MBDS may not have the capability to correct or replace suspicious V2X message field values. Further, the conventional V2X MBDS may not have the capability to correct an initial assessment after the post-detection operation and/or reporting has been performed. According to one or more aspects, whether a suspicious V2X message is to be suppressed may be determined based on a total share (e.g., a percentage) associated with valid information in the V2X message. According to one or more aspects, an incorrect field value in a V2X message may be replaced with a correct value that may be a computed, measured, or prestored value. According to one or more aspects, a backcast propagation process may be used to hone or correct an output of a detector that performs forecast propagation. In particular, an initial assessment about the genuineness of a V2X message may be modified based on the result of the backcast propagation process before the generation or after the transmission of a misbehavior report.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram 100 illustrating an example of a wireless communications system and an access network, in accordance with various aspects of the present disclosure. The illustrated wireless communications system includes a disaggregated base station architecture. The disaggregated base station architecture may include one or more centralized units (CUs) 110 that can communicate directly with a core network 120 via a backhaul link, or indirectly with the core network 120 through one or more disaggregated base station units (such as a Near-Real Time (Near-RT) radio access network (RAN) Intelligent Controller (RIC) 125 via an E2 link, or a Non-Real Time (Non-RT) RIC 115 associated with a Service Management and Orchestration (SMO) Framework 105, or both). A CU 110 may communicate with one or more distributed units (DUs) 130 via respective midhaul links, such as an F1 interface. The DUs 130 may communicate with one or more radio units (Rus) 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an open-RAN (O-RAN) configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by Third Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a virtualized RAN (vRAN) architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open evolved Node B (eNB) (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, long term evolution (LTE), or new radio (NR).

The wireless communications system may further include a Wi-Fi access point (AP) 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet of Things (IoT) devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a V2X component 198 that may be configured to receive a V2X message from a second UE. The V2X message may be a suspicious message. The V2X message may include a plurality of values. Each value in the plurality of values may correspond to a respective field in a plurality of fields. The V2X component 198 may be configured to identify a health score associated with the V2X message. The V2X component 198 may be configured to adjust at least one value in the plurality of values if the health score is greater than a threshold. In certain aspects, the V2X component 198 may be configured to receive a plurality of first V2X messages and a second V2X message. The second V2X message may be subsequent to the plurality of first V2X messages. The V2X component 198 may be configured to identify the second V2X message as being suspicious based on the plurality of first V2X messages. The second V2X message may be inconsistent with the plurality of first V2X messages based on forecasting from the plurality of first V2X messages. The V2X component 198 may be configured to receive a plurality of third V2X messages. The plurality of third V2X messages may be subsequent to the second V2X message. The plurality of third V2X messages may be consistent with each other based on forecasting from at least some third V2X messages in the plurality of third V2X messages. The V2X component 198 may be configured to reevaluate the second V2X message based on backcasting from the plurality of third V2X messages. The V2X component 198 may be configured to generate a report associated with the second V2X message based on the reevaluation of the second V2X message. In different configurations, the V2X component 198 may be implemented with hardware and/or software. Although the following description may be focused on 5G NR, the concepts described herein may be applicable to other similar areas, such as LTE, LTE-A, CDMA, GSM, and other wireless technologies.

Figure 2:
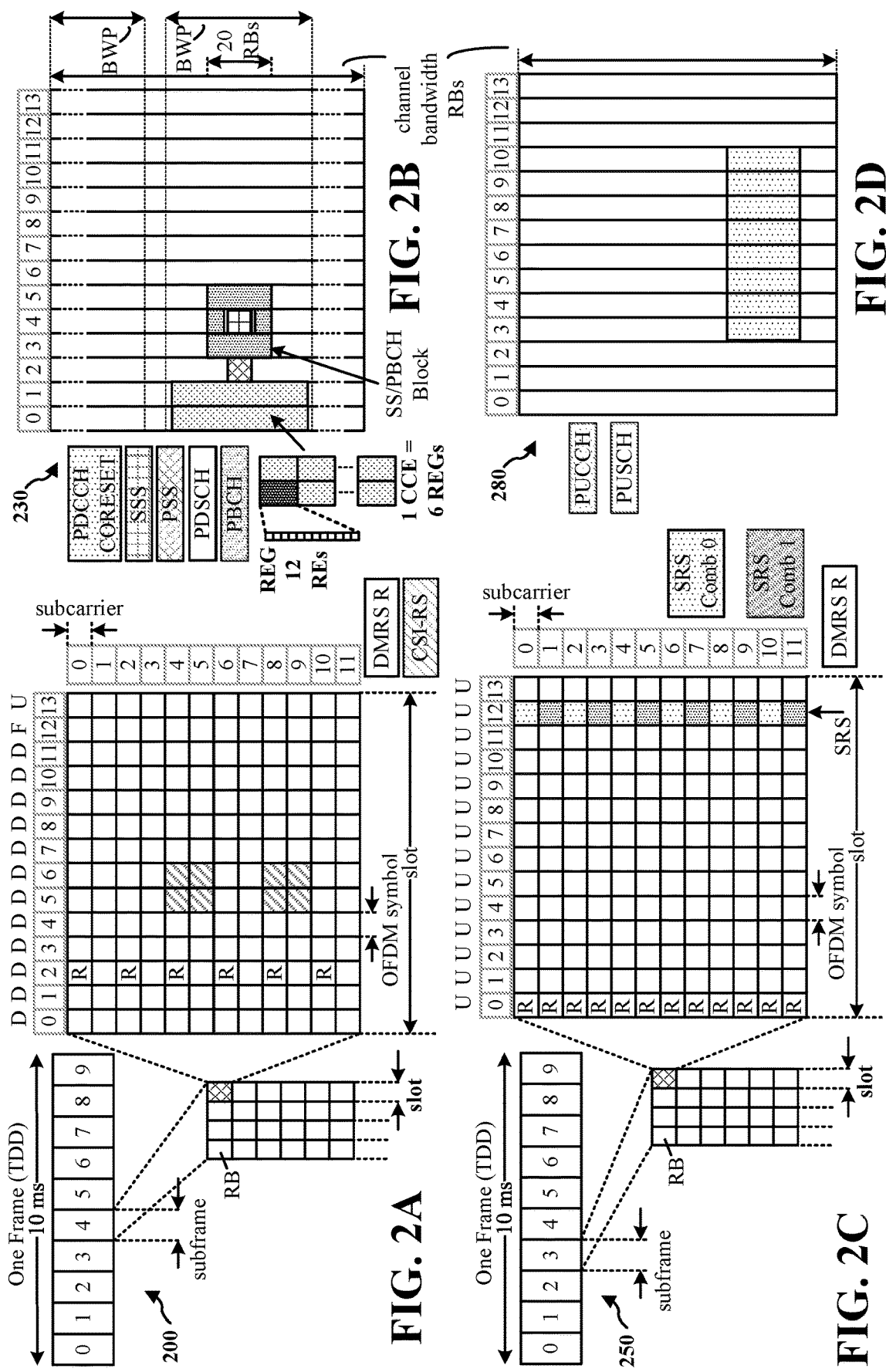
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology 1.1=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
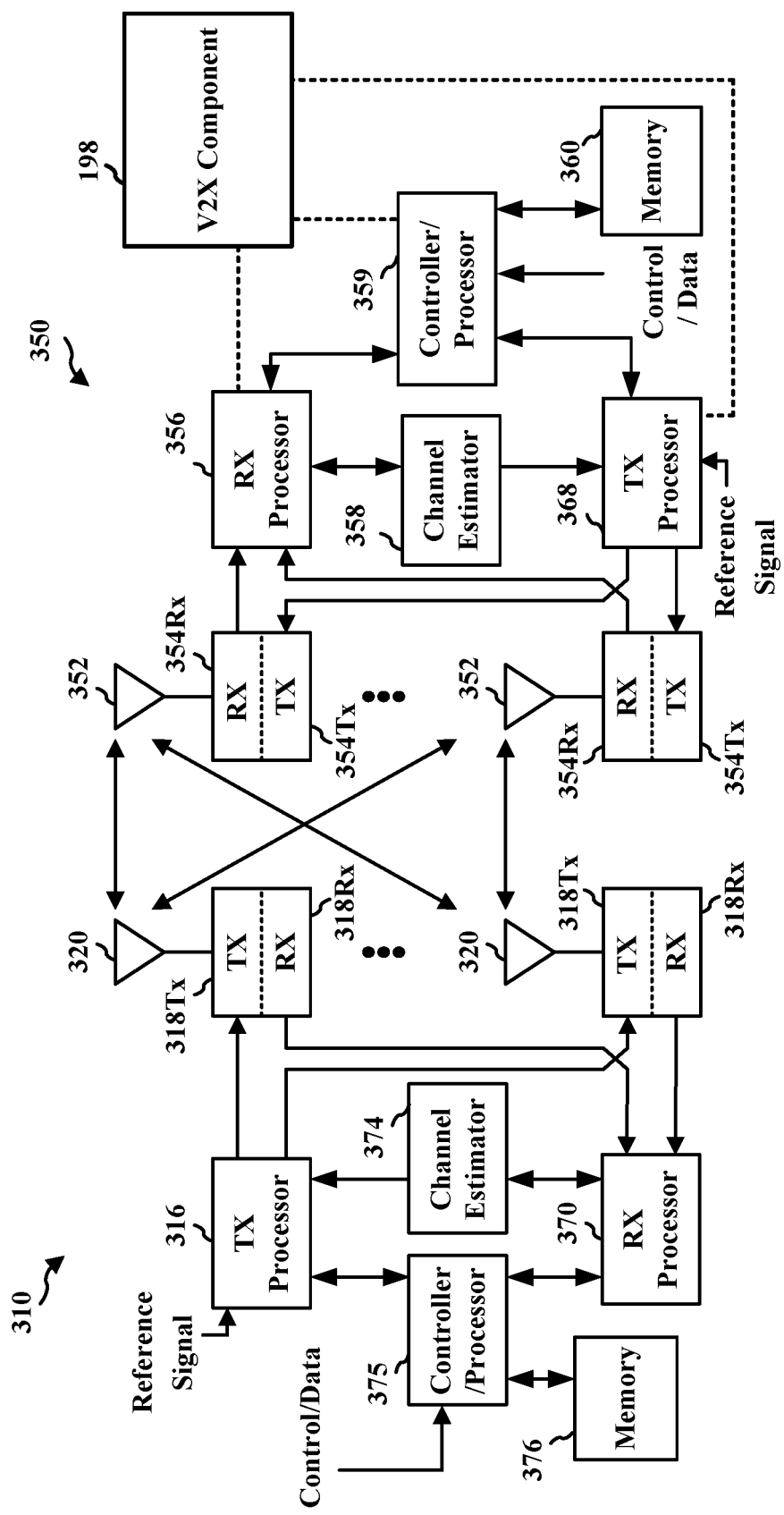
FIG. 3 is a diagram illustrating an example of a base station and user equipment (UE) in an access network, in accordance with various aspects of the present disclosure.

FIG. 3 is a block diagram of a base station 310 in communication with a UE 350 in an access network, in accordance with various aspects of the present disclosure. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the V2X component 198 of FIG. 1.

One or more aspects of the disclosure may relate to fusing the V2X system and the in-vehicle infotainment (IVI) system in a vehicle in order to salvage or correct a suspicious V2X message that may contain valid information. As an example of fusing the V2X system and the IVI system, a V2X object (e.g., an origin of a V2X message such as another vehicle) sending a malicious basic safety message (BSM) (i.e., a type of a V2X message) with implausible dimensions (e.g., vehicle width and length) may be perceived by the sensors (e.g., a light detection and ranging (lidar) device and/or a camera) of the receiver vehicle that receives the malicious BSM. The V2X system of the receiver vehicle may check if the sensors have detected the (malicious) V2X object by verifying if a sensed object and the V2X object share similar attributes (e.g., same position values) that are not suspicious (e.g., implausible dimensions are suspicious). The process of finding a match between a set of sensed objects and a set of V2X objects may be referred to as data association or fusion. In some configurations, as described herein, the V2X system may use the dimensions of the sensed object to correct the implausible dimensions of the V2X object (because the sensed object and the V2X object have been identified as being the same object by association/fusion). A conventional V2X MBDS may not consider salvaging or correcting a suspicious V2X message that may contain valid information. A suspicious V2X message may contain information that is implausible according to the law of physics or inconsistent with other sources of information (e.g., other V2X messages). An example of implausible information may include a V2X message indicating a car traveling at a speed of 500 km/h. An example of inconsistent information may include two V2X messages transmitted by Vehicle A to Vehicle B, where the first V2X message indicates that Vehicle A is a car with a width of 2 m, whereas the second V2X message indicates that Vehicle A is a car with a width of 1 m. Because Vehicle A may have a single width, both messages, if consistent with each other, may indicate a same car width for Vehicle A.

Accordingly, one or more aspects may reduce the loss of valid information that may be carried in a suspicious V2X message. Further, one or more aspects may enable the correction of a genuineness assessment after an initial misbehavior detection. The correction may improve the quality of misbehavior detection.

Figure 4:
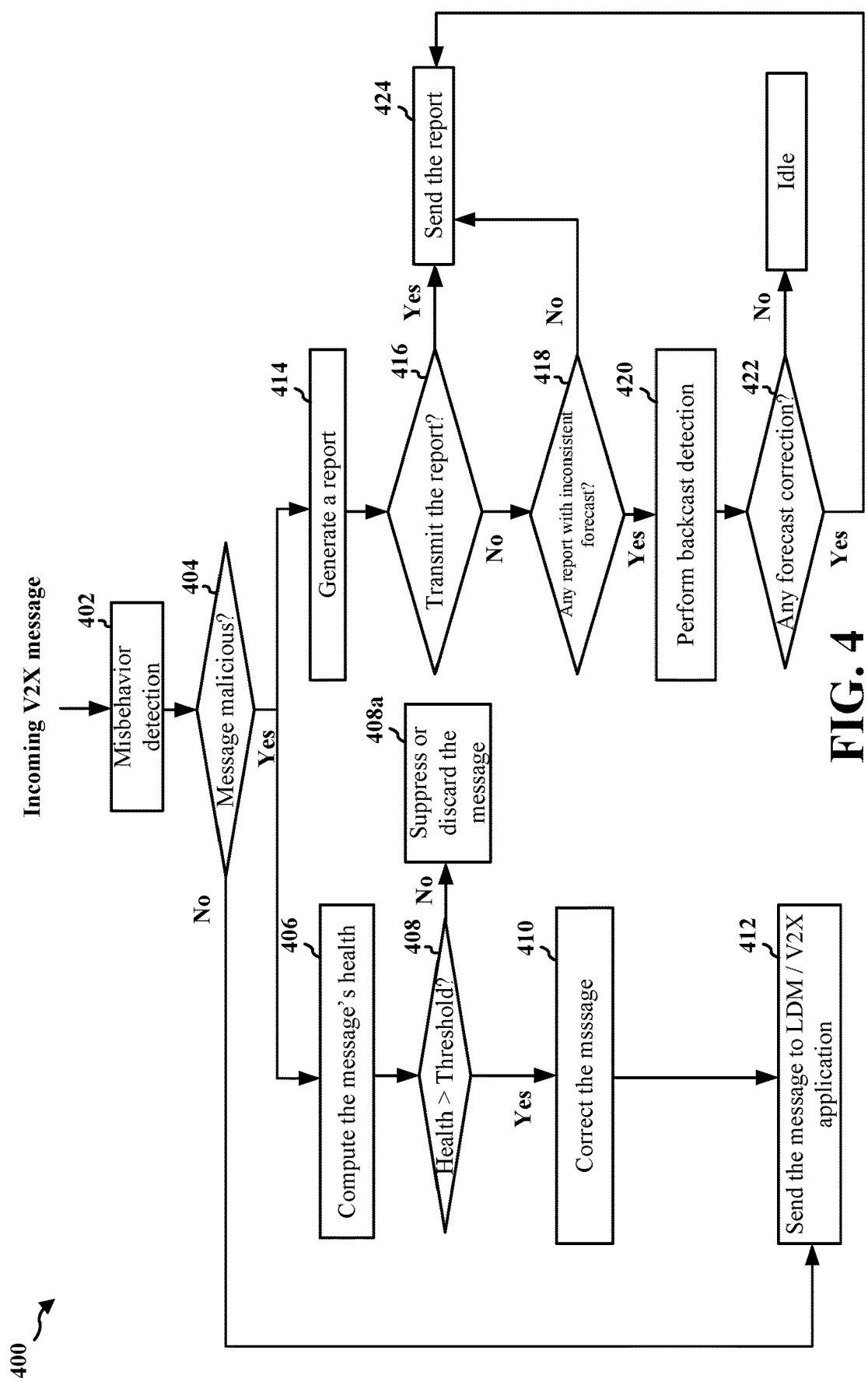
FIG. 4 is a flow diagram of an example process for correcting a suspicious V2X message according to one or more aspects.

FIG. 4 is a flow diagram of an example process 400 for correcting a suspicious V2X message according to one or more aspects. At 402, an MBDS of a vehicle UE may perform initial misbehavior detection on an incoming V2X message.

At 404, the MBDS may determine whether the incoming V2X message is suspicious. For example, the incoming V2X message may be determined as being suspicious if it contains implausible or inconsistent information. An example of detector is the detector named "implausible length". For instance, an "implausible length" detector may check the length data contained in a V2X message named BSM and including the dimension and kinematic state of the transmitter of the V2X message. If the length data contained in the V2X message named BSM is implausible (e.g., 10 m), then the detector may label the V2X message as suspicious. If the incoming V2X message is determined as suspicious, the process may proceed to 406 or 414. If the incoming V2X message is determined as not suspicious (i.e., genuine), the process may proceed to 412, where the UE may transmit the incoming V2X message to a local dynamic map (LDM) application or a V2X application.

At 406, in response to the MBDS determining the incoming V2X message is suspicious at 404, the UE may compute a health score for the incoming V2X message. Details regarding the manner in which the health score for the incoming V2X message may be identified or computed may be described in further detail below.

At 408, the UE may determine whether the health score for the incoming V2X message is greater than a threshold. If the health score is greater than the threshold, the process may proceed to 410. If the health score is not greater than the threshold, at 408a, the UE may suppress or discard the incoming V2X message. For example, if the health score is less than the threshold, the UE may remove the incoming V2X message from the database or other data storage at the UE for V2X messages.

At 410, the UE may correct the incoming V2X message that has been preliminarily determined as suspicious at 404. Details regarding the manner in which the incoming V2X message may be corrected may be described in further detail below.

At 412, the UE may transmit the corrected V2X message to an LDM application or a V2X application.

At 414, also in response to the MBDS determining the incoming V2X message is suspicious at 404, the UE may generate an initial report about the incoming V2X message that has been determined as suspicious at 404.

At 416, the UE may determine whether to transmit the report. For example, the determination at 416 may be based on the remaining size in the report. In another example, the determination at 416 may be based on the available channel bandwidth. For instance, if there is no available bandwidth, the UE may store the report until there is available bandwidth to transmit the report. In yet another example, the determination at 416 may be based on how critical the content of the report is. For example, the UE may transmit the report if the suspicious message may lead to a life-threatening event. If yes, the process may proceed to 424, where the UE may transmit the initial report (e.g., to an application such as an LDM application/database or a V2X application). Further examples of the V2X application may include an application such as a "Cooperative Automated Emergency Brake" application or a "Cooperative Vulnerable Road User Warning" application. In another example, the UE may transmit the report to another device (e.g., an engine control unit (ECU) handling processes related to data fusion or a local sensor (e.g., an automotive camera) that may use the V2X data to calibrate its algorithm for object detection (e.g., the size of the bounding box may be adjusted if it is too small or too large)). In yet another example, the UE may transmit the corrected V2X data to a remote server containing V2X applications that may utilize the V2X data (e.g., for traffic monitoring).

At 418, the UE may determine whether the initial report may include an inconsistent forecast. In other words, the UE may determine whether the incoming V2X message includes any suspicious field values that may be identified based on forecast propagation. Forecast propagation may refer to a process to determine the validity of a later V2X message (or a field value thereof) based on one or more earlier V2X messages. For instance, if the speed (s) and the position (p1) of a vehicle at an instant t1 are known, the position (p2) of the vehicle at instant t2 may be estimated based on the formula s=d/(t2−t1) (assuming the speed remains constant, and the vehicle's trajectory is linear). Therefore, p2=p1+d. This may be an example of a formula of position forecast. In additional examples, there may be more advanced ways to perform motion forecast for position as well as speed, acceleration, and or orientation. Examples of the more advanced ways may include the Particle Filter, the Kalman filter (KF) and variants of the KF (extended KF (EKF), unscented KF (UKF), etc.), and AI-based approaches (e.g., ML, Neural Networks, etc.). If yes, the process may proceed to 420. If no, the process may proceed to 424 and the UE may transmit the initial report about the incoming V2X message (e.g., to an application). Details regarding the manner in which the forecast propagation may be performed are described in further detail below.

At 420, the UE may perform backcast detection to reevaluate the genuineness of the suspicious field value. Details regarding the manner in which the backcast propagation or detection may be performed may be described in further detail below.

At 422, the UE may determine whether a correction to the result of the previous forecast propagation is to be performed. If the UE determines that a field value that is initially identified as suspicious at 418 is reevaluated as being genuine at 420, a correction to the result of the previous forecast propagation may be performed. In that case, the process may proceed to 424.

The backcasting approach may also be used to identify the cause that led to the initial misidentification of a V2X message as suspicious. For instance, assuming a forecasting function f ( ) that provides an estimation of the kinematic state contained the next received V2X message (X'n+1) from a specific transmitter based on a previously received V2X message1 (X1 Xn) from the same transmitter such that f(X1, . . . , Xn)=X'n+1, the backcasting approach may be used to identify whether the estimate is similar to the content of the next received V2X message (Xn+1) such that X'n+1~X n+1, where the symbol ~ may denote similarity. In other words, whether several features (position, speed, acceleration) of both the estimated message and the actual message are similar may be determined. For instance, referring to the position (P) between both messages, if |P'n+1−Pn+1|<threshold, then the two positions may be considered similar. The threshold may be a value that accounts for potential errors in GNSS measurements or due to the forecast algorithms (because an estimate may not always be accurate). Based on the above, if X'n+1≠X n+1, then it may be unknown if Xn+1 is suspicious (i.e., if an attacker has inserted an incorrect kinematic value) or if one or multiple inputs are suspicious (X1, . . . , Xn). However, assuming a backcast function g( ) such that g(Xn+2, . . . , Xn+m)=X"n+1, where X"n+1 may be an estimation of the kinematic state for X n+1, whether X"n+1~X n+1 may be identified using the backcast function. The same process may be performed for up to X1. In summary, more accurate characterizations than X'n+1 (that includes X1, . . . , Xn) is inconsistent with X n+1 because X'n+1~X n+1 may be derived based on the backcasting approach. Further, a correction may be made if the initial statement was "X n+1 is suspicious" instead of "X'n+1 is inconsistent with X n+1". The correction or the more accurate characterization may include the message identified as suspicious once the backcast process is completed.

At 424, the UE may transmit the (initial or modified) report about the incoming V2X message (e.g., to an application).

In one or more configurations, a UE may determine whether an incoming V2X message is to be suppressed based on a total share (e.g., a percentage) associated with valid information in the incoming V2X message. In particular, valid information may be information that may not cause any of the misbehavior detection processes to indicate any misbehavior. As described above, a suspicious V2X message may contain information that is implausible according to the laws of physics or inconsistent with other sources of information/V2X messages. An example of implausible information may be a V2X message indicating a car with a speed of 500 km/h. An example of inconsistent information may be two V2X messages transmitted from a same vehicle A to a vehicle B indicating two different widths for vehicle A (the two V2X messages should indicate a consistent width for the vehicle A as the vehicle A may have a single width) (e.g., the first V2X message may describe vehicle A as a car with a width of 2 m but the inconsistent second V2X message may describe vehicle A as a car with a width of 1 m).

The UE may compute the total share associated with the valid information contained in the incoming V2X message. Based on the total share associated with valid information, the UE may decide between suppressing the whole V2X message (e.g., if the total share associated with valid information is not greater than a threshold) or accepting and processing the valid information carried in the V2X message (e.g., if the total share associated with valid information is greater than the threshold). Hereinafter the total share associated with valid information in a V2X message may be referred to as a health score of the V2X message, which may be computed at 406.

Figure 5:
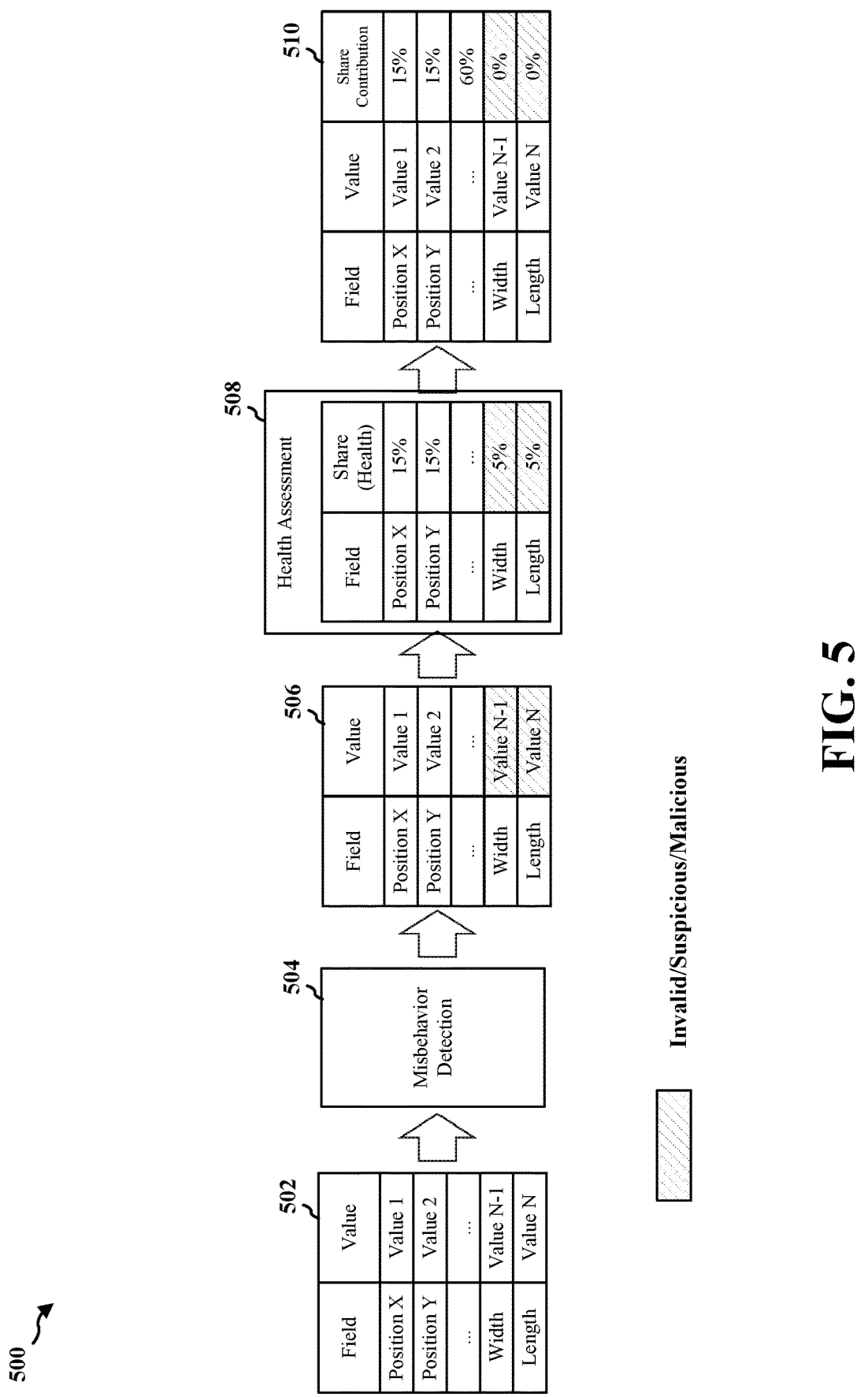
FIGS. 5-7 are diagrams illustrating an example process for correcting a suspicious V2X message, in accordance with various aspects of the present disclosure.
Figure 6:
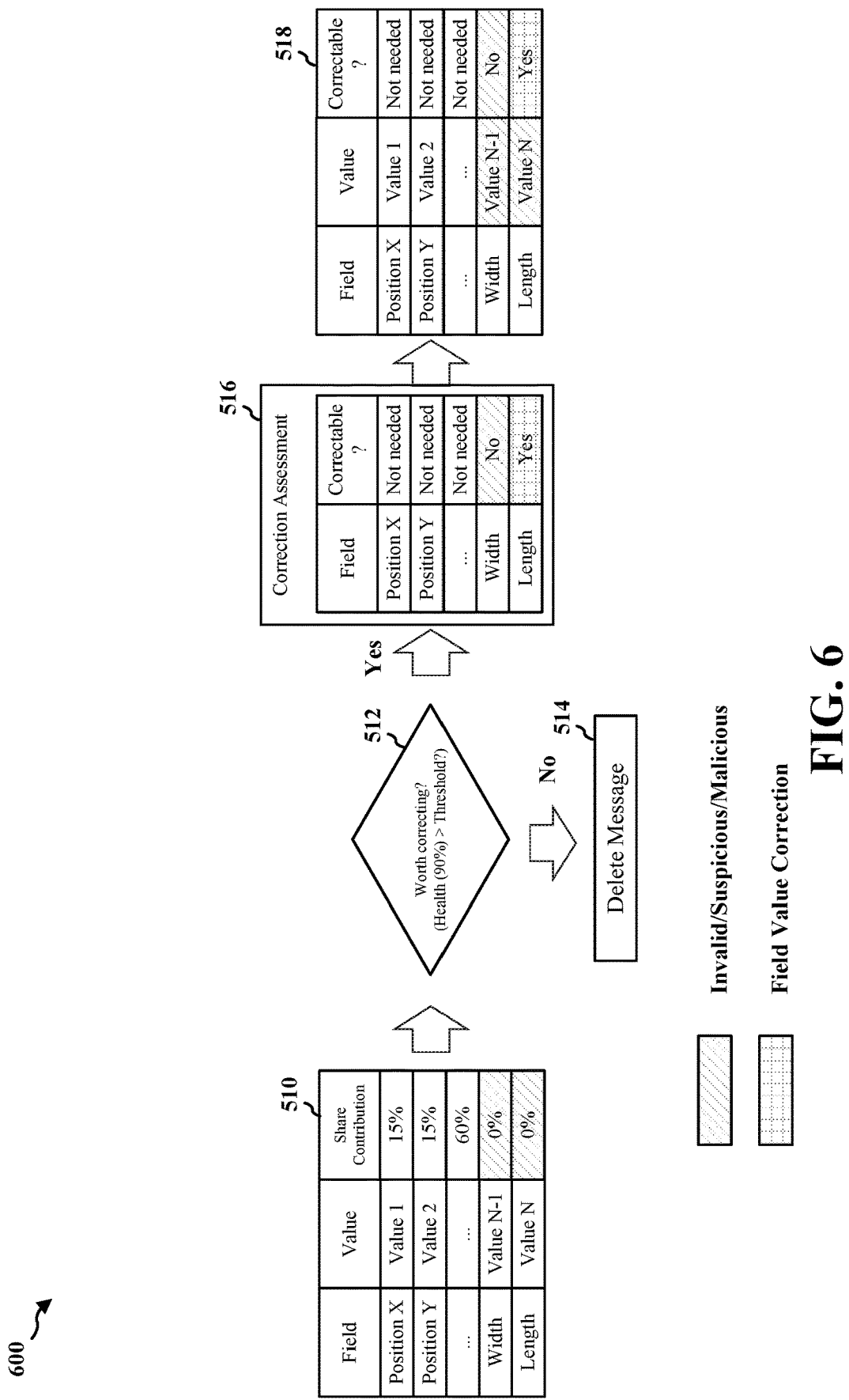
Figure 7:
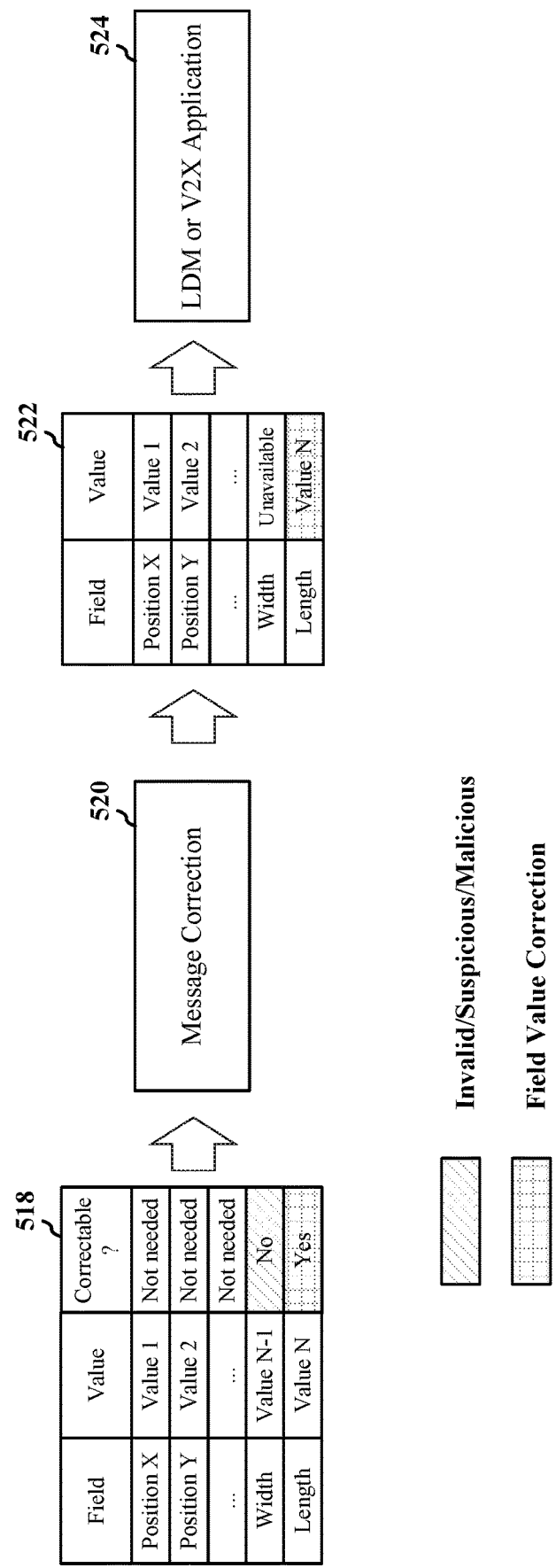

FIGS. 5-7 are diagrams 500, 600, and 700 illustrating an example process for correcting a suspicious V2X message according to one or more aspects of the present disclosure. The diagram 502 shows an incoming V2X message. The V2X message may include a plurality of values (e.g., N values). Each value in the plurality of values may correspond to a respective field in a plurality of fields (e.g., N fields). For example, Value 1 may correspond to the field "Position X" (i.e., the X-position of the origin UE of the V2X message). Similarly, Value 2 may correspond to the field "Position Y" (i.e., the Y-position of the origin UE of the V2X message), Value N−1 may correspond to the field "Width" (i.e., the width of the origin UE of the V2X message), and Value N may correspond to the field "Length" (i.e., the length of the origin UE of the V2X message). Although a UE may be described as the origin of V2X messages in some aspects described herein, the V2X messages may also be transmitted or received by other types of devices. Examples may include the road-side unit (RSU) or vehicles or vulnerable road users equipped with a UE or an onboard unit (OBU). In another example, a V2X message (which may be suspicious) may be transmitted by a server. For example, a server may transmit a V2X message to vehicles to suggest maneuvers for vehicles in a specific area. For instance, a server or an infrastructure entity monitoring the traffic may send V2X data messages over transmission control protocol (TCP)/internet protocol (IP) (TCP/IP) to an RSU to indicate the maneuver proposal. The RSU may analyze the V2X data sent by the server, and may correct any suspicious data if appropriate.

At 504, the UE may perform initial misbehavior detection on the V2X message. The diagram 506 shows the result of the misbehavior detection. A field value that may trigger a misbehavior detector may be identified as being invalid (which may also be referred to hereinafter as not healthy, unhealthy, suspicious, malicious, non-genuine, false, bogus, corrupt, etc.). In the illustrated example, as shown at 506, two field values, that is, Value N−1 for the field "Width" and Value N for the field "Length," may be identified as not healthy.

At 508, the UE may perform a health assessment on the V2X message to identify a health score for the V2X message. As described above, the health score may refer to the total share associated with valid information (e.g., percentage of correctness) in the whole V2X message. Each field and the corresponding field value may be associated with a respective predefined health score share (e.g., a percentage). For example, as shown at 508, the field "Position X" may be associated with a health score share of 15%, the field "Position Y" may be associated with a health score share of 15%, the field "Width" may be associated with a health score share of 5%, and the field "Length" may be associated with a health score share of 5%.

To identify the health score for the V2X message, at 510, respective health score shares associated with field values that are identified as healthy (which may also be referred to hereinafter as genuine, valid, etc.) at 504 may be aggregated. The health score associated with the V2X message may be the sum of the respective health score shares associated with the field values that are identified as healthy. In other words, a field value that is healthy may contribute to the health score of the V2X message based on the predefined health score share associated with the corresponding field. In contrast, a field value that is not healthy may not contribute to the health score of the V2X message (i.e., the contribution of a field value that is not healthy may be 0%). Therefore, as shown at 510, because Value N−1 for the field "Width" and Value N for the field "Length" are identified as not healthy, these two field values may contribute 0% to the health score of the V2X message. Accordingly, at 510, it may be determined that the health score of this example V2X message may be 90%.

At 512, the UE may determine whether the V2X message is worth correcting. The V2X message may be worth correcting if the health score of the V2X message is greater than a threshold. On the other hand, the V2X message may not be worth correcting, and may be suppressed or deleted in its entirety if the health score of the V2X message it not greater than the threshold.

In one or more configurations, the threshold may be based on one or more of an application, a field, or a context. In some further configurations, the threshold may be based on a regulation, a standard, or a policy authority. For example, a safety application may utilize at least a position field and a speed field. Thus, position and speed fields may be associated with higher predefined health score shares (e.g., 15% and 15%) compared to a dimension field (e.g., 5%). In this example, if the threshold is set to be 84% (i.e., the message may be deemed worth correcting if the health score is greater than 84%), the system may allow one of the crucial fields (e.g., a position field or a speed field) to be not healthy (taking into consideration that it may be corrected). In another example, if the threshold is set to be 85%, the system may not repair a message that contains an unhealthy field value that corresponds to a crucial field (e.g., a position field or a speed field). In different configurations, different messages types may be associated with different thresholds. For instance, for the event warning message (e.g., a decentralized environmental notification message (DENM)), the position of the event may not be as safety critical as the position of the vehicle. Accordingly, the threshold associated with the event warning message may be 70% instead of 85%.

In one or more configurations, the plurality of fields in the V2X message may be associated with equal predefined health score shares. For example, if the V2X message contains 10 fields, each field may be associated with a predefined health score share of 10%. In such configurations, the threshold may correspond to a total quantity share (e.g., a percentage) of healthy field values in the total quantity of field values. For example, if the threshold is set to be 50%, the system may not attempt to repair the message if more than half of all the fields of the V2X message are associated with unhealthy field values.

Therefore, according to one or more aspects described above, the data quality of a V2X message may be analyzed quantitatively. In particular, the share of the corrupt field values may be quantified. The UE may suppress the V2X message if the V2X message is overly corrupt (i.e., if the health score of the V2X message is not greater than the threshold). Accordingly, an attacker may spend additional effort to cause the whole V2X message to be suppressed by the MBDS (e.g., an attacker may attempt to cause a V2X message to be suppressed so the attacker may place the blame on the receiver that has suppressed valid safety critical data (e.g., the position of the vehicle) due to the presence of malicious dimension data).

If the V2X message is determined as not worth correcting (i.e., the health score of the V2X message, 90%, is not greater than the threshold), the whole V2X message may be deleted or suppressed at 514.

On the other hand, if the V2X message is determined as worth correcting (i.e., the health score of the V2X message, 90%, is greater than the threshold), at 516, the UE may assess the correctability of field values that are not healthy. Correctability of a field value may change over time. For example, a light detection and ranging (LIDAR) device may not enable the correction of a position field if the target (i.e., the origin UE of the V2X message) has moved outside the detection range of the LIDAR device. In this example, as shown at 516, the UE may identify that the field value for the "Width" field may not be correctable, but the field value for the "Length" field may be correctable. A combined view of the V2X message and the correctability of suspicious field values is shown at 518.

For field values that are not healthy but are correctable, at 520, the UE may perform message correction to correct these field values. Field values that are not healthy and are not correctable may be suppressed. Therefore, the result of the message correction operation is shown at 522, where, in the corrected V2X message, the original Value N that is not healthy may be replaced by a correct Value N. For example, in different configurations, an unhealthy speed value may be replaced by a) a speed value as measured using the sensors of the UE/subject vehicle, b) an average speed value associated with the road, or c) a speed value as measured by another connected vehicle (the UE/subject vehicle may receive the measured speed value in a V2X message). Further, the field value for the field "Width" may be suppressed, and may become unavailable.

In particular, a V2X message field value that is not healthy may be corrected, and may be replaced with a correct value using a computed, measured, or prestored value. For instance, the predicted motion value may be used to replace field values for motion fields that are identified as not healthy. For example, the UE may derive an estimate of a speed of the origin UE based on the position and generation time contained in the suspicious V2X message (the generation time of the suspicious V2X message may be t2) as well as a previous V2X message (the generation time of the previous V2X message may be 0). Assuming the position and the generation time are correct, the UE may use the formula $v=[p(t2)-p(t1)]/(t2-t1)$, where v is the predicted speed of the origin UE at t2 based on the vehicle displacement between the previous position at t1 and the actual position at t2 (i.e., $p(t2)-p(t1)$ is the vehicle displacement). In another configuration, a prestored value may be used to replace a field value that is identified as not healthy. An example of a prestored value may be a dimensional value from a previous healthy message transmitted by the same transmitter (i.e., origin UE). For another example, the prestored value may be a default model (e.g., a car model with a default length and a default width). Further, in some configurations, automotive sensors (if available) (e.g., a LIDAR device) may be used to replace or correct V2X message field values.

At 524, the UE may transmit the corrected V2X message to an LDM application or a V2X application. An LDM application may be a database that may contain all the data from V2X messages received from surrounding connected vehicles and data to be transmitted in each V2X message to be transmitted by the UE. Further, an example of a V2X application may be an electronic emergency brake light (EEBL) application. The EEBL application may provide a warning if a vehicle in front of the subject vehicle (i.e., the UE) brakes suddenly with a high deceleration.

According to one or more aspects, a backcast propagation process may be used to hone or correct an output of a detector that performs forecast propagation. The UE may modify the initial assessment about the genuineness of a V2X message before the generation or after the transmission of a misbehavior report associated with the V2X message.

Figure 8:
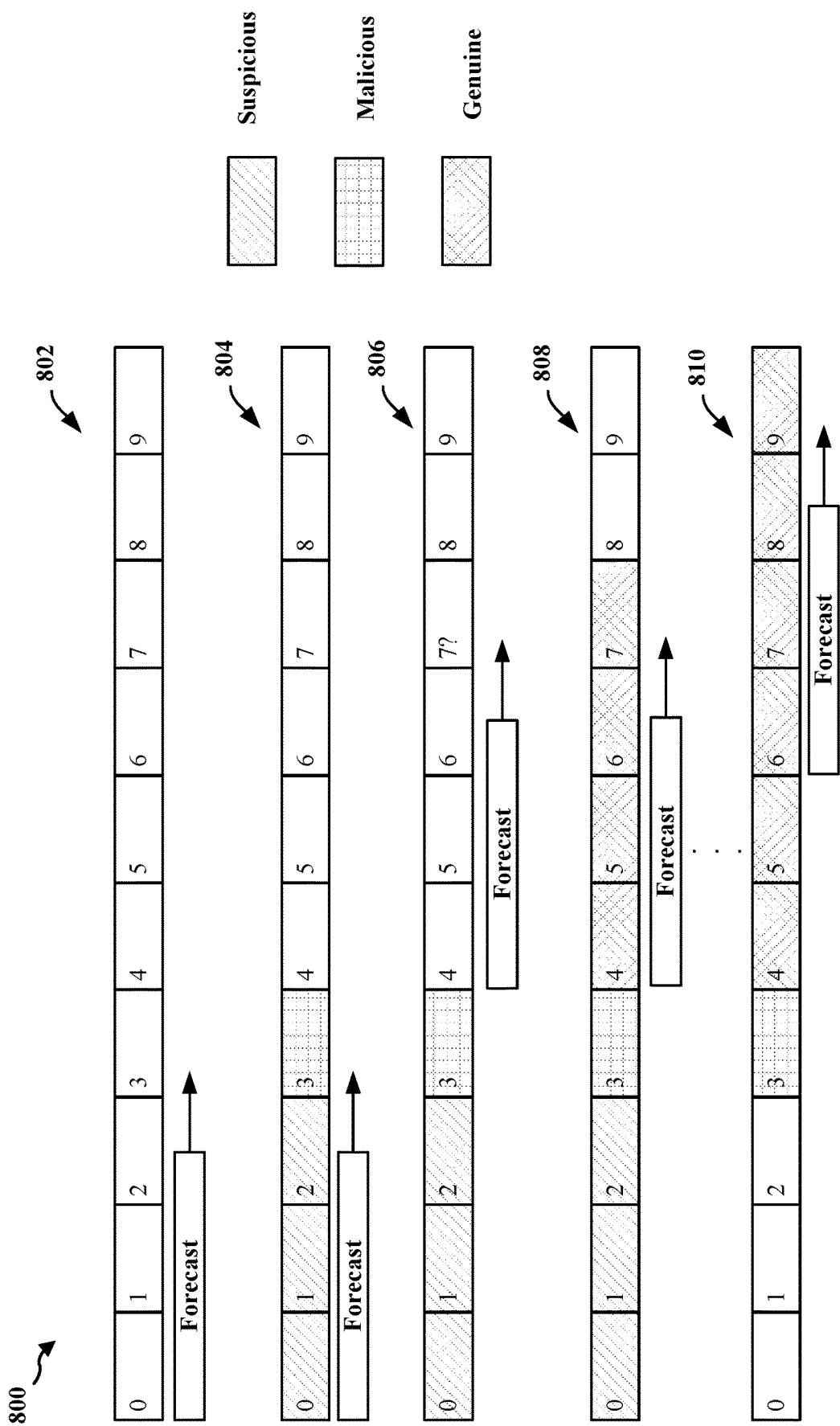
FIG. 8 is an example diagram illustrating forecast propagation, in accordance with various aspects of the present disclosure.

FIG. 8 is an example diagram 800 illustrating forecast propagation, in accordance with various aspects of the present disclosure. Each of the diagrams 802, 804, 806, 808, or 810 shows the same 10 V2X messages (Message at $t_0$ through Message at $t_9$) received by a UE. The UE may assess the genuineness of each of the V2X messages using a forecast detector based on forecast propagation. In particular, as shown at 802, the UE may use the forecast detector to predict motion data at $t_n$ (at 802 and 804, n=3). The forecast detector may take as inputs the V2X messages at $t_0$ through $t_{n-1}$.

At 804, the forecast detector may assess the V2X message at $t_3$. If the difference between a predicted motion and the motion as indicated by the data in the received V2X message under assessment (i.e., the V2X message at $t_3$) is greater than a detection threshold (e.g., a mean squared error (MSE) threshold), the V2X message under assessment (i.e., the V2X message at $t_3$) may be labeled as suspicious. Accordingly, V2X message at $t_3$ may be referred to as being inconsistent with V2X messages at $t_0$ through $t_3$. Further, previous V2X messages (i.e., the V2X messages at $t_0$ through $t_2$) may be labeled as either genuine or suspicious.

Because the V2X message at t3 is labeled as suspicious, it may not be used for forecast propagation for subsequent V2X messages. Therefore, at 806, the forecast detector may wait for the next 4 V2X messages (i.e., the V2X messages at $t_3$ through $t_7$) in order to assess the genuineness of the V2X message at $t_7$.

At 806, if the V2X message at $t_7$ is consistent with the V2X messages at $t_4$ through $t_6$, all the V2X messages at $t_4$ through $t_7$ may be labeled as genuine. At 808, the UE may label the V2X message at is as genuine if the V2X message at $t_8$ is consistent with the V2X messages at $t_4$ through $t_7$. Similarly, the UE may label the V2X message at $t_9$ as genuine if the V2X message at $t_9$ is consistent with the V2X messages at $t_4$ through $t_8$.

Therefore, as shown in FIG. 8, a forward predictor may use at least previous m message(s) (e.g., m=3) as inputs to predict and to verify the motion consistency (e.g., position, speed, acceleration, heading, etc.) between the immediately subsequent message and the previous m message(s). In other words, at initialization (e.g., when the very first messages are received), it may not be possible to assess the consistency of the first m message(s) due to the nonexistence of past messages. As a result, the forecast detector may label and report the (m+1)th message counted from initialization as suspicious because the forecast detector may assume the first m message(s) as genuine without actual basis and the (m+1)th message may be inconsistent with the first m message(s). However, the non-genuine messages may actually be one or more of the first m message(s), while the (m+1)th message may actually be genuine. In such a scenario, the forecast detector may not be able to correctly identify the message that is actually non-genuine. As a result, one or more messages may be inappropriately accepted or suppressed.

Figure 9:
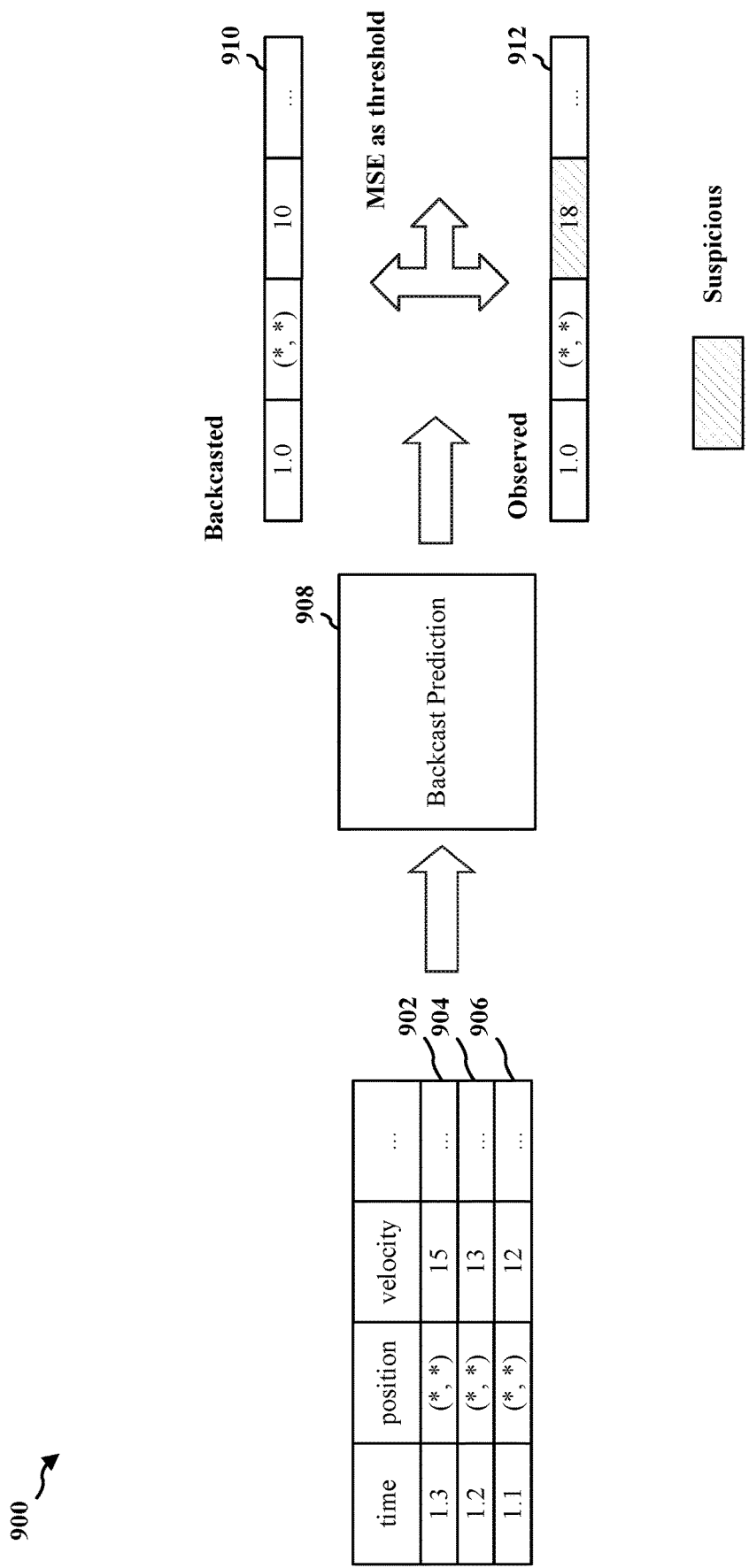
FIG. 9 is a diagram illustrating an example backcasting process according to one or more aspects of the present disclosure.

FIG. 9 is a diagram illustrating an example backcasting process 900 according to one or more aspects of the present disclosure. Backcasting or backcast propagation may refer to "forecasting" backward in time, that is, using a later (future) time series to "predict" a past data point. In particular, backcasting may include applying the "forecasting" process to a series starting from an end point to a beginning point (e.g., $t_n$ to $t_1$, where n>1) to "predict" the data point immediately before the beginning point at $t_0$. In misbehavior reporting, a reporter routine may provide evidence to show a particular V2X message (e.g., a basic safety message (BSM)) is false. By applying backcasting, the reporter routine may extrapolate the V2X message field values (e.g., values of BSM fields such as time, location, velocity, etc.) at time to based on field values of later V2X message (e.g., the message at $t_n$ to the message at $t_1$), and may compare the extrapolated V2X message field values with the field values in the actual V2X message that was received at $t_0$. The backcasting process (which may also be referred to as the backcast propagation process) may be used together with the forecast propagation process to strengthen the evidence that tends to show a particular V2X message is either genuine or non-genuine. However, the backcasting process may not be used together with the forecast propagation process in real time because the backcasting process may use later V2X messages as inputs, which may not be available yet when the forecast propagation process is performed.

For example, as shown in FIG. 9, at 908, the backcast "prediction" propagation process may be applied to three later V2X messages 902, 904, and 906 corresponding to times at time 1.3, time 1.2, and time 1.0 in order to backcast a V2X message 910 at time 1.0. In particular, based on velocity values of 15, 13, and 12 at time 1.3, time 1.2, and time 1.0, respectively, the backcasted velocity value for time 1.0 may be 10. However, because the V2X message actually received (observed) at time 1.0 includes a velocity value of 18, which may differ from the backcasted value (i.e., 10) by greater than a detection threshold (e.g., an MSE threshold), the backcast detector may label the received V2X message 912 corresponding to time 1.0 (in particular, the velocity value) as suspicious (non-genuine).

Figure 10:
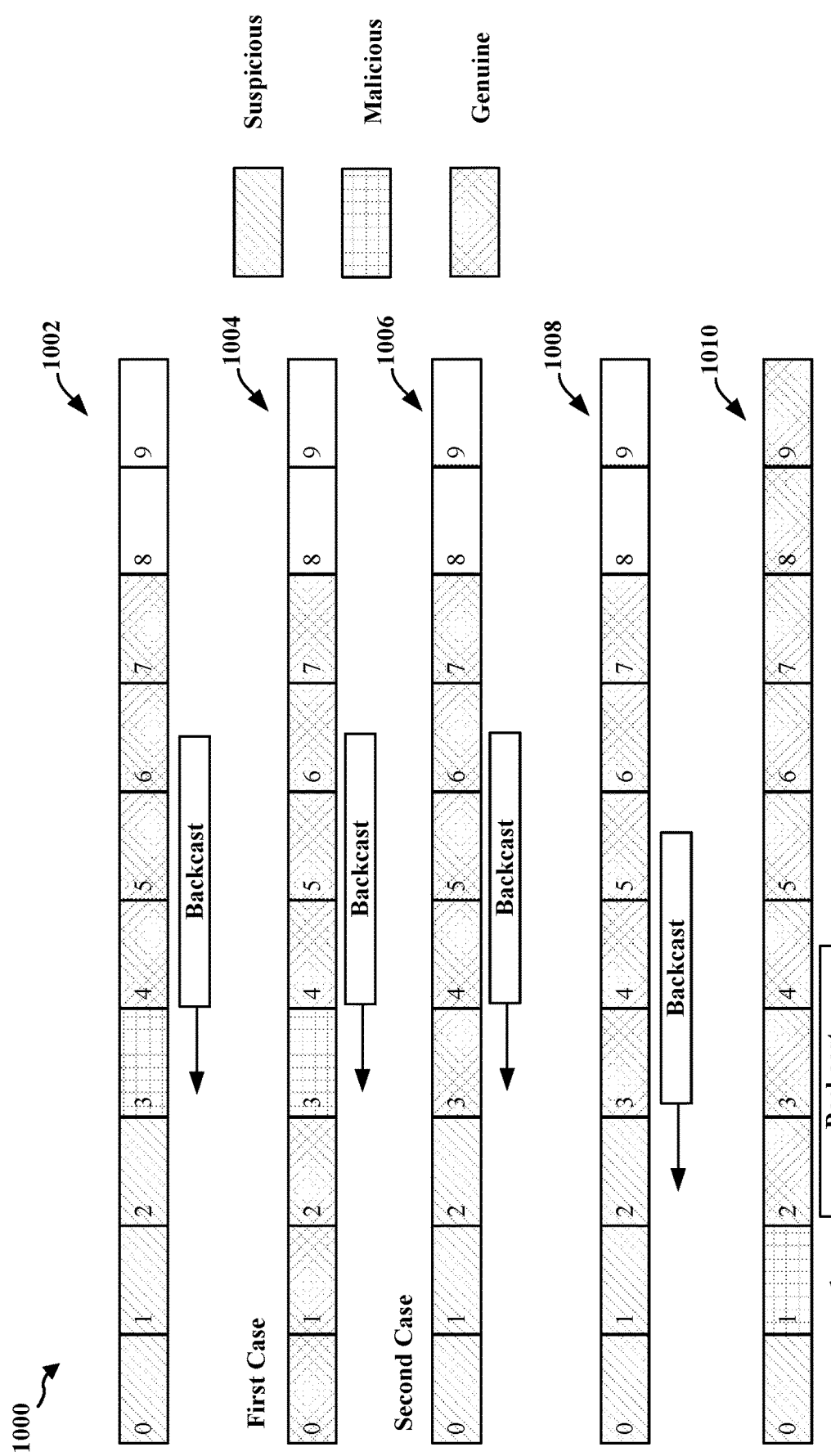
FIG. 10 is an example diagram illustrating backcast propagation according to one or more aspects of the present disclosure.

FIG. 10 is an example diagram 1000 illustrating backcast propagation according to one or more aspects of the present disclosure. The messages and the status (suspicious, malicious, or genuine, etc.) of the messages illustrated in the diagram 1002 may correspond to the messages and the status illustrated in the diagram 808 in FIG. 8. A backcast detector may attempt to "predict" and assess the genuineness of the motion data in the V2X message at time $t_3$ based on field values from V2X messages at $t_4$ to $t_6$ as inputs and the backcasting process described above. As shown in FIG. 8, the V2X message at $t_3$ may have been labeled suspicious based on forecast propagation from the V2X messages at $t_0$ to $t_2$, where the V2X messages at $t_0$ to $t_2$ may be assumed genuine in the forecast propagation. The assessment of the V2X message at $t_3$ based on the backcasting process may yield one of two possible outcomes. In a first case, as illustrated in the diagram 1004, the V2X message at $t_3$ may be confirmed as suspicious based on the field values from V2X messages at $t_4$ to $t_6$ and the backcasting process. Further, the V2X messages at $t_0$ to $t_2$ may be confirmed as genuine because these messages are likely to be genuine given that they are inconsistent with the V2X message at $t_3$ that is confirmed suspicious.

A second case may be illustrated in the diagrams 1006, 1008, and 1010. In particular, at 1006, based on the field values from V2X messages at $t_4$ to $t_6$ and the backcasting process, the backcast detector may find the V2X message at $t_3$ to actually be genuine, despite the initial suspicious label placed on the V2X message at $t_3$ by the forecast detector. Therefore, the label of the V2X message at $t_3$ may be corrected to reflect the genuine status of the V2X message at $t_3$. Next, at 1008, the backcast detector may further assess the genuineness of the motion data in the V2X message at time $t_2$ based on field values from V2X messages at $t_3$ to $t_5$ (the V2X message at $t_3$ having been found as being genuine by the backcast detector) as inputs and the backcasting process. In the example shown in diagrams 1008 and 1010, the V2X message at $t_2$ may be confirmed as being genuine as well by the backcast detector. In a similar fashion, the backcast detector may proceed to assess the genuineness of the motion data in the V2X message at $t_1$ and in the V2X message at $t_0$, one V2X message at a time, based on the backcasting process. As shown in the diagram 1010, the backcast detector may find the V2X message at $t_1$ to actually be a suspicious message, and may label the V2X message at $t_1$ as a suspicious message. In some configurations, the remaining V2X message at $t_0$ may be labeled as a suspicious message because V2X message at $t_0$ may not be verified using either forecast propagation or backcast propagation.

In scenarios such as the example illustrated in diagrams 1006, 1008, and 1010, because the backcast detector makes changes to the status of the V2X messages that was initially assigned by the forecast detector, if a report about the genuineness of the V2X messages concerned has been generated and transmitted, the misbehavior report system (MBRS) may generate and transmit a corrected report indicating the updated status of the V2X messages concerned (e.g., the status of the V2X message at $t_3$ may be updated to reflect the genuine status and the status of the V2X message at $t_1$ may be updated to reflect the suspicious status).

Therefore, as illustrated in FIGS. 9 and 10, based on backcast propagation, the consistency of the (n+1)th message (e.g., the message at $t_3$) may be verified using one or more next messages (e.g., the (n+2)th message and one or more later still messages) as the input. Furthermore, the backcasting process may be used to assess the consistency of the initial V2X messages that are assumed to be genuine in the forecast propagation. In other words, the backcasting process may assess if the (n+1)th message as well as the initial messages (e.g., the first message to the nth message, that is, messages at $t_0$ to $t_{n-1}$) is consistent with the set of later consistent messages. If the initial messages are found to be inconsistent or non-genuine, then the MBDS/MBRS may correct the initial misbehavior report generated based on the forecast propagation alone, or alternatively, may generate and send a new misbehavior report including the correction. Therefore, based on the backcasting process, the output of a forward forecast detector may be verified and/or improved. Further, a correct misbehavior report reflecting the actual genuineness status of the V2X messages may be generated and transmitted. In the event that the status indicated in a transmitted initial misbehavior report is found to be incorrect based on the backcasting process, a corrected misbehavior report indicating the updated, correct status of the V2X messages may be generated and transmitted.

Figure 11:
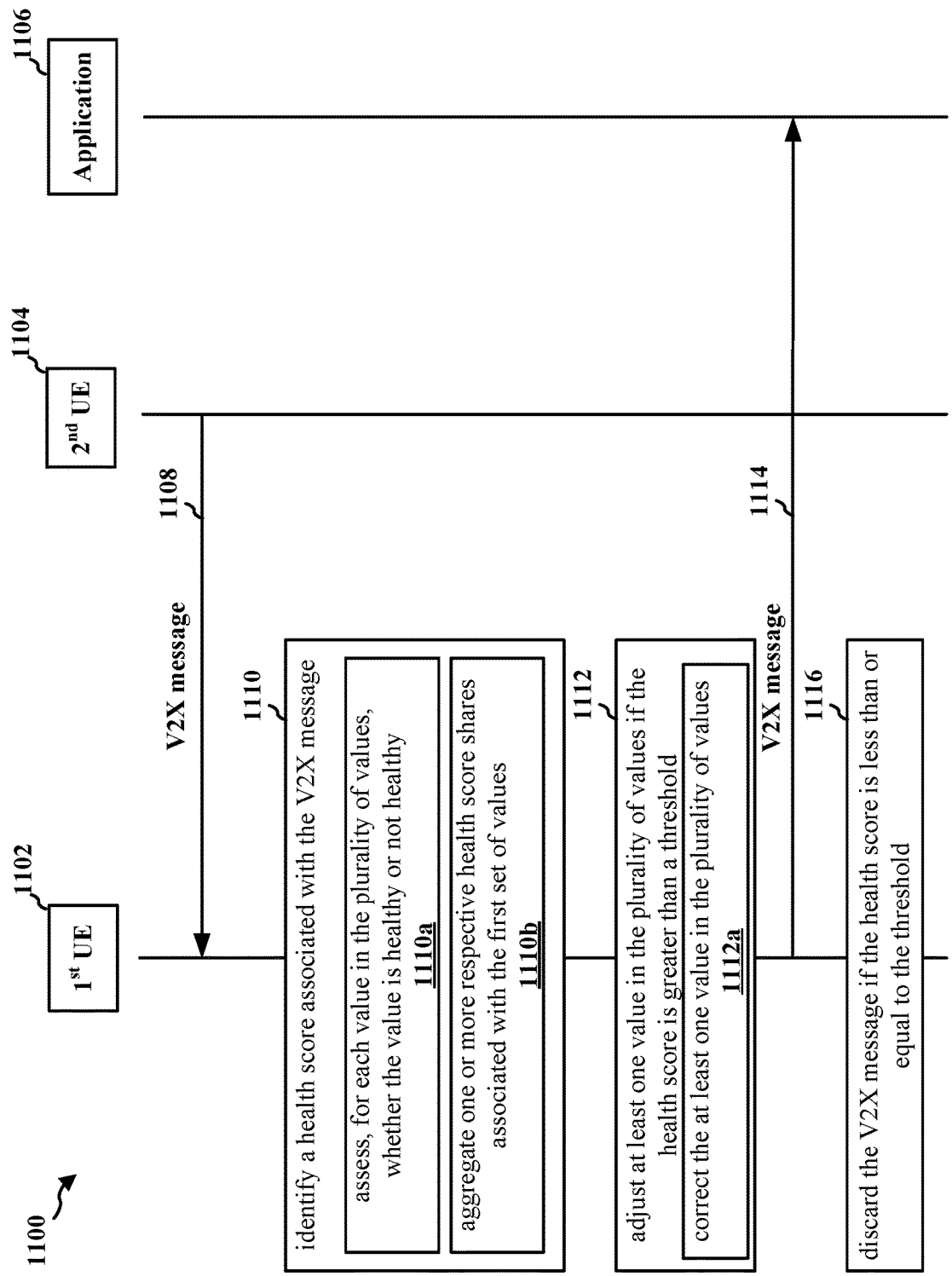
FIG. 11 is a flow diagram of an example process for correcting a suspicious V2X message according to one or more aspects of the present disclosure.

FIG. 11 is a flow diagram of an example process 1100 for correcting a suspicious V2X message according to one or more aspects of the present disclosure. At 1108, the first UE 1102 (e.g., a first vehicle UE) may receive a V2X message from a second UE 1104 (e.g., a second vehicle UE). The V2X message may be a suspicious message (e.g., based on an initial assessment of the MBDS of the first UE 1102). The V2X message may include a plurality of values. Each value in the plurality of values may correspond to a respective field in a plurality of fields.

At 1110, the first UE 1102 may identify a health score associated with the V2X message 1108.

To identify the health score associated with the V2X message, at 1110a, the first UE 1102 may assess, for each value in the plurality of values, whether the value is healthy or not healthy. The plurality of values may include a first set of values that are assessed as being healthy and a second set of values that are assessed as being not healthy. In particular, in one configuration, each value in the second set of values may trigger a misbehavior detector, which may indicate that the value has been assessed as being not healthy.

At 1110b, the first UE 1102 may aggregate one or more respective health score shares associated with the first set of values. Each value in the plurality of values may be associated with a respective predefined health score share. The health score associated with the V2X message may correspond to a sum of the one or more respective health score shares associated with the first set of values (i.e., the set of values that are assessed as being healthy).

In one configuration, the plurality of values may be associated with equal predefined health score shares.

In one configuration, the plurality of values may be associated with different predefined health score shares.

At 1112, the first UE 1102 may adjust at least one value in the plurality of values if the health score is greater than a threshold. The at least one value may belong in the second set of values (i.e., the at least one value may have been assessed as being not healthy) On the other hand, at 1116, the first UE 1102 may discard the V2X message if the health score is less than or equal to the threshold.

To adjust the at least one value in the plurality of values, at 1112a, the first UE 1102 may correct the at least one value in the plurality of values if the health score is greater than the threshold (e.g., to an application 1106, such as an LDM application or a V2X application). In particular, the first UE 1102 may replace the at least one value with a correct value. The correct value may be a computed, measured, or pre-stored value.

At 1114, the first UE 1102 may transmit the V2X message after adjusting the at least one value in the plurality of values.

Figure 12:
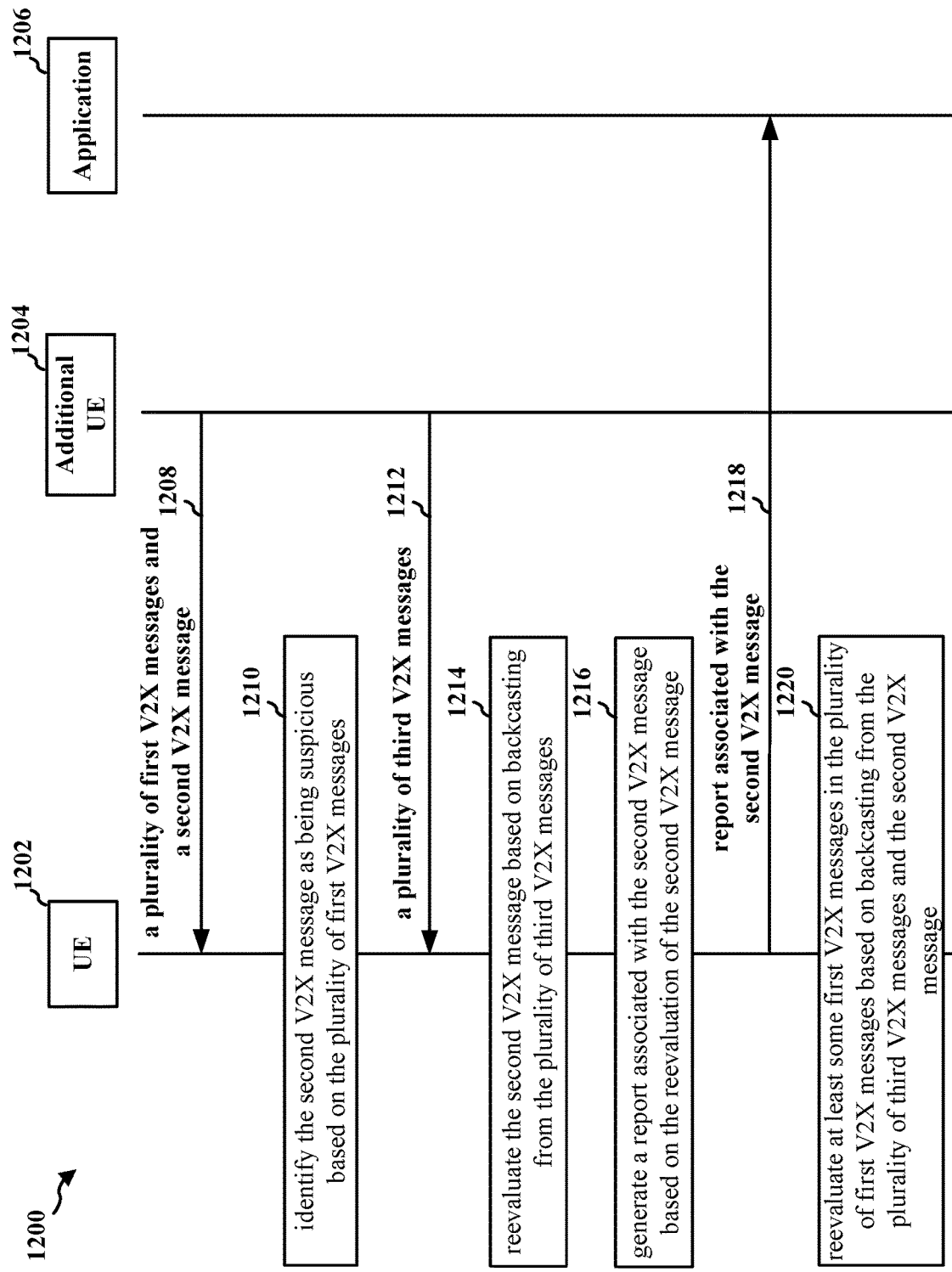
FIG. 12 is a flow diagram of an example process for reevaluating a suspicious field value of a V2X message based on backcast propagation according to one or more aspects of the present disclosure.

FIG. 12 is a flow diagram of an example process 1200 for reevaluating a suspicious field value of a V2X message based on backcast propagation according to one or more aspects of the present disclosure. At 1208, the UE 1202 (e.g., a vehicle UE) may receive a plurality of first V2X messages and a second V2X message (e.g., from an additional UE 1204). The second V2X message may be subsequent to the plurality of first V2X messages.

At 1210, the UE 1202 may identify the second V2X message as being suspicious based on the plurality of first V2X messages. The second V2X message may be inconsistent with the plurality of first V2X messages based on forecasting from the plurality of first V2X messages.

At 1212, the UE 1202 may receive a plurality of third V2X messages (e.g., from the additional UE 1204). The plurality of third V2X messages may be subsequent to the second V2X message. The plurality of third V2X messages may be consistent with each other based on forecasting from at least some third V2X messages in the plurality of third V2X messages.

At 1214, the UE 1202 may reevaluate the second V2X message based on backcasting from the plurality of third V2X messages.

At 1216, the UE 1202 may generate a report associated with the second V2X message based on the reevaluation of the second V2X message.

At 1218, the UE 1202 may transmit the report associated with the second V2X message based on the reevaluation of the second V2X message (e.g., to an application 1206). The report may be transmitted after generating the report.

At 1220, if the second V2X message is identified as being genuine based on the reevaluation of the second V2X message, the UE 1202 may reevaluate at least some first V2X messages in the plurality of first V2X messages based on backcasting from the plurality of third V2X messages and the second V2X message.

Figure 13:
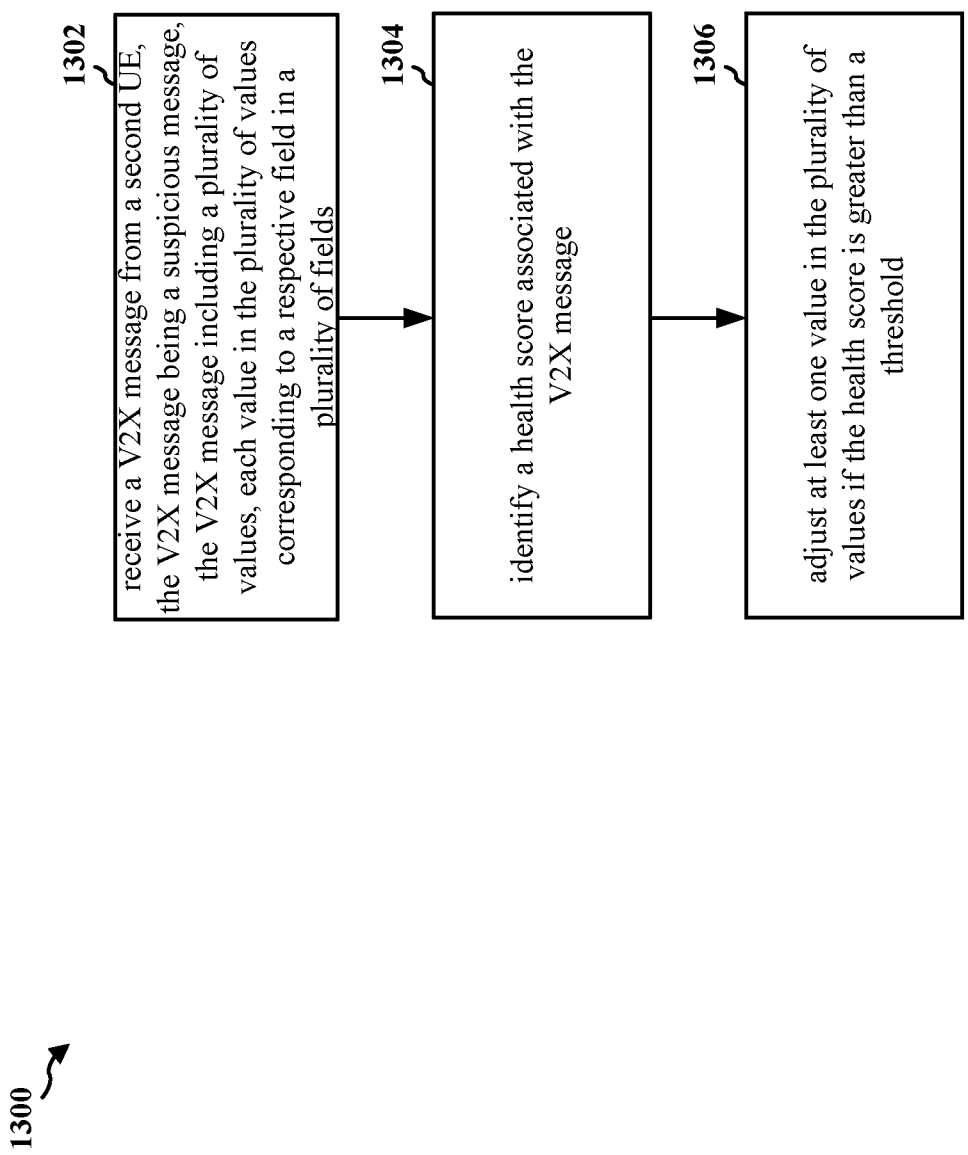
FIG. 13 is a flowchart of a method of wireless communication, in accordance with various aspects of the present disclosure.

FIG. 13 is a flowchart 1300 of a method of wireless communication, in accordance with various aspects of the present disclosure. The method may be performed by a first UE (e.g., the UE 104/350; the first UE 1102; the apparatus 1704). At 1302, the first UE may receive a V2X message from a second UE. The V2X message may be a suspicious message. The V2X message may include a plurality of values. Each value in the plurality of values may correspond to a respective field in a plurality of fields. For example, 1302 may be performed by the component 198 in FIG. 17. Referring to FIG. 11, at 1108, the first UE 1102 may receive a V2X message from a second UE 1104.

At 1304, the first UE may identify a health score associated with the V2X message. For example, 1304 may be performed by the component 198 in FIG. 17. Referring to FIG. 11, at 1110, the first UE 1102 may identify a health score associated with the V2X message 1108.

At 1306, the first UE may adjust at least one value in the plurality of values if the health score is greater than a threshold. For example, 1306 may be performed by the component 198 in FIG. 17. Referring to FIG. 11, at 1112, the first UE 1102 may adjust at least one value in the plurality of values if the health score is greater than a threshold.

Figure 14:
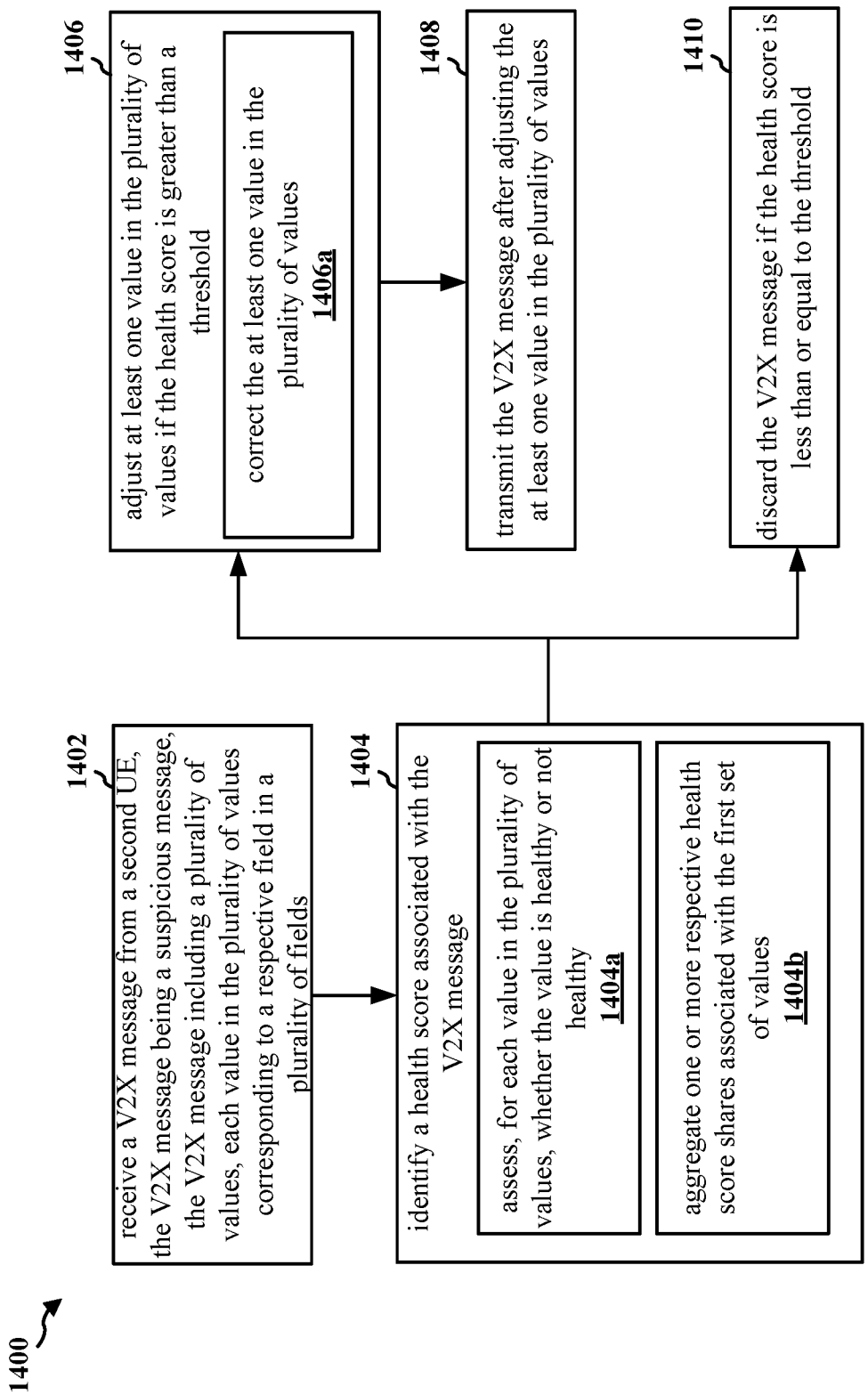
FIG. 14 is a flowchart of a method of wireless communication, in accordance with various aspects of the present disclosure.

FIG. 14 is a flowchart 1400 of a method of wireless communication, in accordance with various aspects of the present disclosure. The method may be performed by a first UE (e.g., the UE 104/350; the first UE 1102; the apparatus 1704). At 1402, the first UE may receive a V2X message from a second UE. The V2X message may be a suspicious message. The V2X message may include a plurality of values. Each value in the plurality of values may correspond to a respective field in a plurality of fields. For example, 1402 may be performed by the component 198 in FIG. 17. Referring to FIG. 11, at 1108, the first UE 1102 may receive a V2X message from a second UE 1104.

At 1404, the first UE may identify a health score associated with the V2X message. For example, 1404 may be performed by the component 198 in FIG. 17. Referring to FIG. 11, at 1110, the first UE 1102 may identify a health score associated with the V2X message 1108.

At 1406, the first UE may adjust at least one value in the plurality of values if the health score is greater than a threshold. For example, 1406 may be performed by the component 198 in FIG. 17. Referring to FIG. 11, at 1112, the first UE 1102 may adjust at least one value in the plurality of values if the health score is greater than a threshold.

In one configuration, at 1410, the first UE may discard the V2X message if the health score is less than or equal to the threshold. For example, 1410 may be performed by the component 198 in FIG. 17. Referring to FIG. 11, at 1116, the first UE 1102 may discard the V2X message 1108 if the health score is less than or equal to the threshold.

In one configuration, at 1408, the first UE may transmit the V2X message after adjusting the at least one value in the plurality of values. For example, 1408 may be performed by the component 198 in FIG. 17. Referring to FIG. 11, at 1114, the first UE 1102 may transmit the V2X message after adjusting the at least one value in the plurality of values.

In one configuration, referring to FIG. 11, the V2X message 1114 may be transmitted to application 1106 (e.g., at least one of an LDM application or a V2X application).

In one configuration, to adjust the at least one value in the plurality of values, at 1406a, the first UE may correct the at least one value in the plurality of values if the health score is greater than the threshold. For example, 1408 may be performed by the component 198 in FIG. 17. Referring to FIG. 11, at 1112a, the first UE 1102 may correct the at least one value in the plurality of values if the health score is greater than the threshold.

In one configuration, to identify the health score associated with the V2X message, at 1404a, the first UE may assess, for each value in the plurality of values, whether the value is healthy or not healthy. The plurality of values may include a first set of values that are assessed as being healthy and a second set of values that are assessed as being not healthy. For example, 1404a may be performed by the component 198 in FIG. 17. Referring to FIG. 11, at 1110a, the first UE 1102 may assess, for each value in the plurality of values, whether the value is healthy or not healthy.

At 1404b, the first UE may aggregate one or more respective health score shares associated with the first set of values. Each value in the plurality of values may be associated with a respective predefined health score share. The health score associated with the V2X message may correspond to a sum of the one or more respective health score shares associated with the first set of values. For example, 1404b may be performed by the component 198 in FIG. 17. Referring to FIG. 11, at 1110b, the first UE 1102 may aggregate one or more respective health score shares associated with the first set of values.

In one configuration, the plurality of values may be associated with equal predefined health score shares.

In one configuration, the plurality of values may be associated with different predefined health score shares.

In one configuration, each value in the second set of values may trigger a misbehavior detector.

In one configuration, referring to FIG. 11, to adjust the at least one value in the plurality of values, at 1112, the first UE 1102 may replace the at least one value with a correct value. The at least one value may belong in the second set of values. The correct value may be a computed, measured, or prestored value.

In one configuration, referring to FIG. 11, the first UE 1102 may be a first vehicle UE. The second UE 1104 may be a second vehicle UE.

Figure 15:
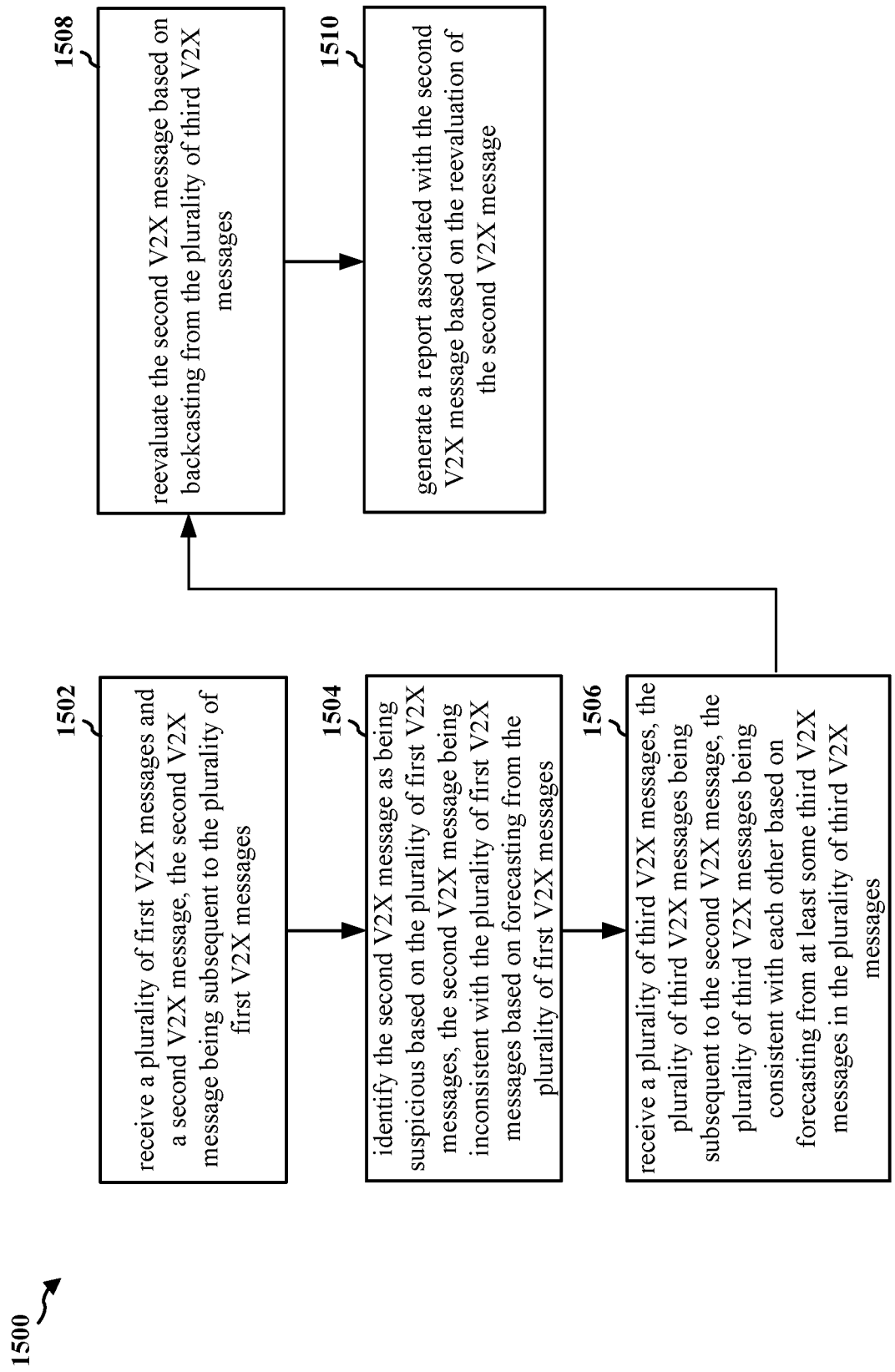
FIG. 15 is a flowchart of a method of wireless communication, in accordance with various aspects of the present disclosure.

FIG. 15 is a flowchart 1500 of a method of wireless communication, in accordance with various aspects of the present disclosure. The method may be performed by a UE (e.g., the UE 104/350; the first UE 1202; the apparatus 1704). At 1502, the UE may receive a plurality of first V2X messages and a second V2X message. The second V2X message may be subsequent to the plurality of first V2X messages. For example, 1502 may be performed by the component 198 in FIG. 17. Referring to FIG. 12, at 1208, the UE 1202 may receive a plurality of first V2X messages and a second V2X message.

At 1504, the UE may identify the second V2X message as being suspicious based on the plurality of first V2X messages. The second V2X message may be inconsistent with the plurality of first V2X messages based on forecasting from the plurality of first V2X messages. For example, 1504 may be performed by the component 198 in FIG. 17. Referring to FIG. 12, at 1210, the UE 1202 may identify the second V2X message as being suspicious based on the plurality of first V2X messages.

At 1506, the UE may receive a plurality of third V2X messages. The plurality of third V2X messages may be subsequent to the second V2X message. The plurality of third V2X messages may be consistent with each other based on forecasting from at least some third V2X messages in the plurality of third V2X messages. For example, 1506 may be performed by the component 198 in FIG. 17. Referring to FIG. 12, at 1212, the UE 1202 may receive a plurality of third V2X messages.

At 1508, the UE may reevaluate the second V2X message based on backcasting from the plurality of third V2X messages. For example, 1508 may be performed by the component 198 in FIG. 17. Referring to FIG. 12, at 1214, the UE 1202 may reevaluate the second V2X message based on backcasting from the plurality of third V2X messages.

At 1510, the UE may generate a report associated with the second V2X message based on the reevaluation of the second V2X message. For example, 1510 may be performed by the component 198 in FIG. 17. Referring to FIG. 12, at 1216, the UE 1202 may generate a report associated with the second V2X message based on the reevaluation of the second V2X message.

Figure 16:
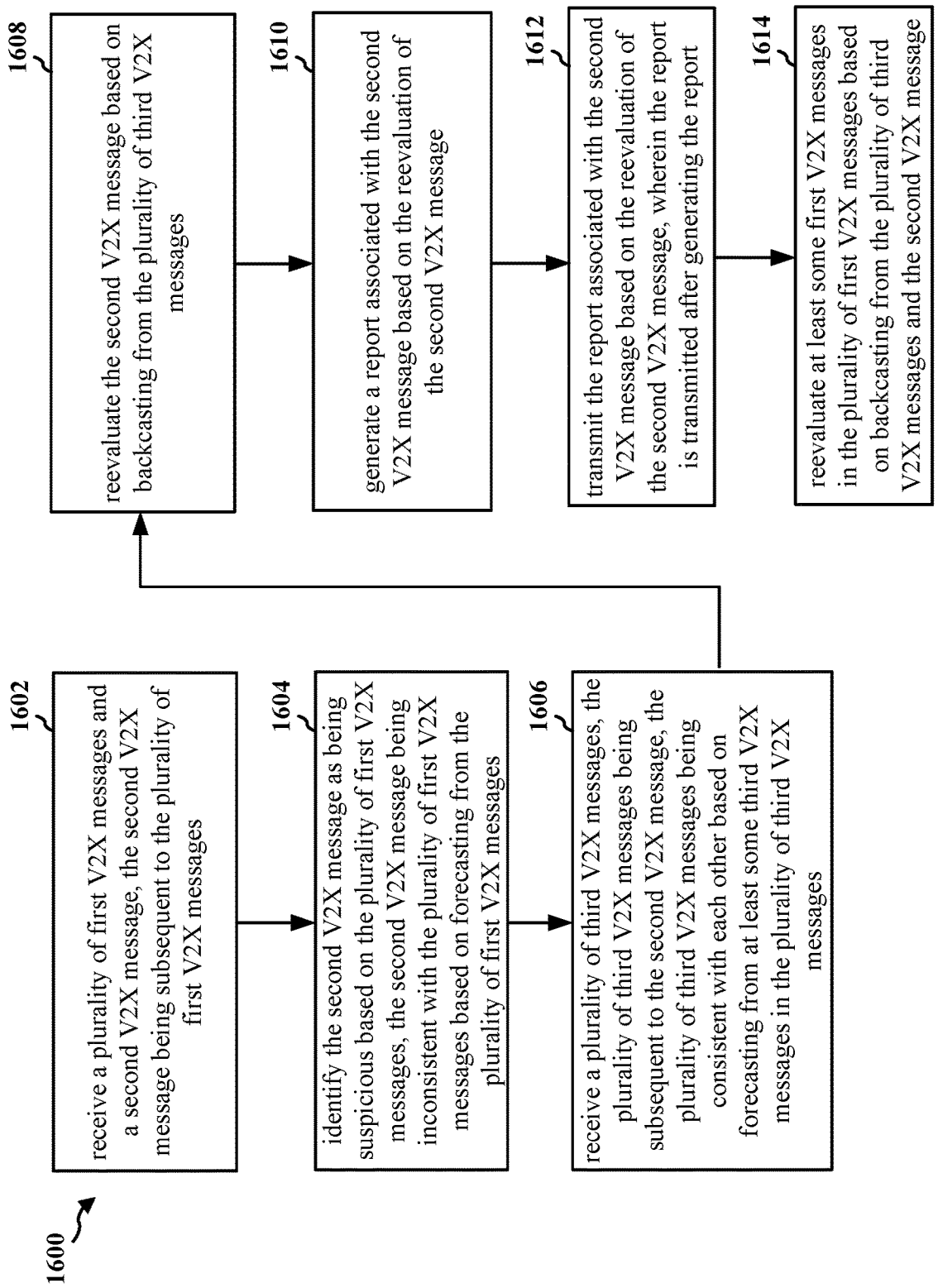
FIG. 16 is a flowchart of a method of wireless communication, in accordance with various aspects of the present disclosure.

FIG. 16 is a flowchart 1600 of a method of wireless communication, in accordance with various aspects of the present disclosure. The method may be performed by a UE (e.g., the UE 104/350; the first UE 1202; the apparatus 1704). At 1602, the UE may receive a plurality of first V2X messages and a second V2X message. The second V2X message may be subsequent to the plurality of first V2X messages. For example, 1602 may be performed by the component 198 in FIG. 17. Referring to FIG. 12, at 1208, the UE 1202 may receive a plurality of first V2X messages and a second V2X message.

At 1604, the UE may identify the second V2X message as being suspicious based on the plurality of first V2X messages. The second V2X message may be inconsistent with the plurality of first V2X messages based on forecasting from the plurality of first V2X messages. For example, 1604 may be performed by the component 198 in FIG. 17. Referring to FIG. 12, at 1210, the UE 1202 may identify the second V2X message as being suspicious based on the plurality of first V2X messages.

At 1606, the UE may receive a plurality of third V2X messages. The plurality of third V2X messages may be subsequent to the second V2X message. The plurality of third V2X messages may be consistent with each other based on forecasting from at least some third V2X messages in the plurality of third V2X messages. For example, 1606 may be performed by the component 198 in FIG. 17. Referring to FIG. 12, at 1212, the UE 1202 may receive a plurality of third V2X messages.

At 1608, the UE may reevaluate the second V2X message based on backcasting from the plurality of third V2X messages. For example, 1608 may be performed by the component 198 in FIG. 17. Referring to FIG. 12, at 1214, the UE 1202 may reevaluate the second V2X message based on backcasting from the plurality of third V2X messages.

At 1610, the UE may generate a report associated with the second V2X message based on the reevaluation of the second V2X message. For example, 1610 may be performed by the component 198 in FIG. 17. Referring to FIG. 12, at 1216, the UE 1202 may generate a report associated with the second V2X message based on the reevaluation of the second V2X message.

In one configuration, if the second V2X message is identified as being genuine based on the reevaluation of the second V2X message, at 1614, the UE may reevaluate at least some first V2X messages in the plurality of first V2X messages based on backcasting from the plurality of third V2X messages and the second V2X message. For example, 1614 may be performed by the component 198 in FIG. 17. Referring to FIG. 12, at 1220, the UE 1202 may reevaluate at least some first V2X messages in the plurality of first V2X messages based on backcasting from the plurality of third V2X messages and the second V2X message.

In one configuration, at 1612, the UE may transmit the report associated with the second V2X message based on the reevaluation of the second V2X message. The report may be transmitted after generating the report. For example, 1612 may be performed by the component 198 in FIG. 17. Referring to FIG. 12, at 1218, the UE 1202 may transmit the report associated with the second V2X message based on the reevaluation of the second V2X message.

In one configuration, referring to FIG. 12, the UE 1202 may be a vehicle UE.

Figure 17:
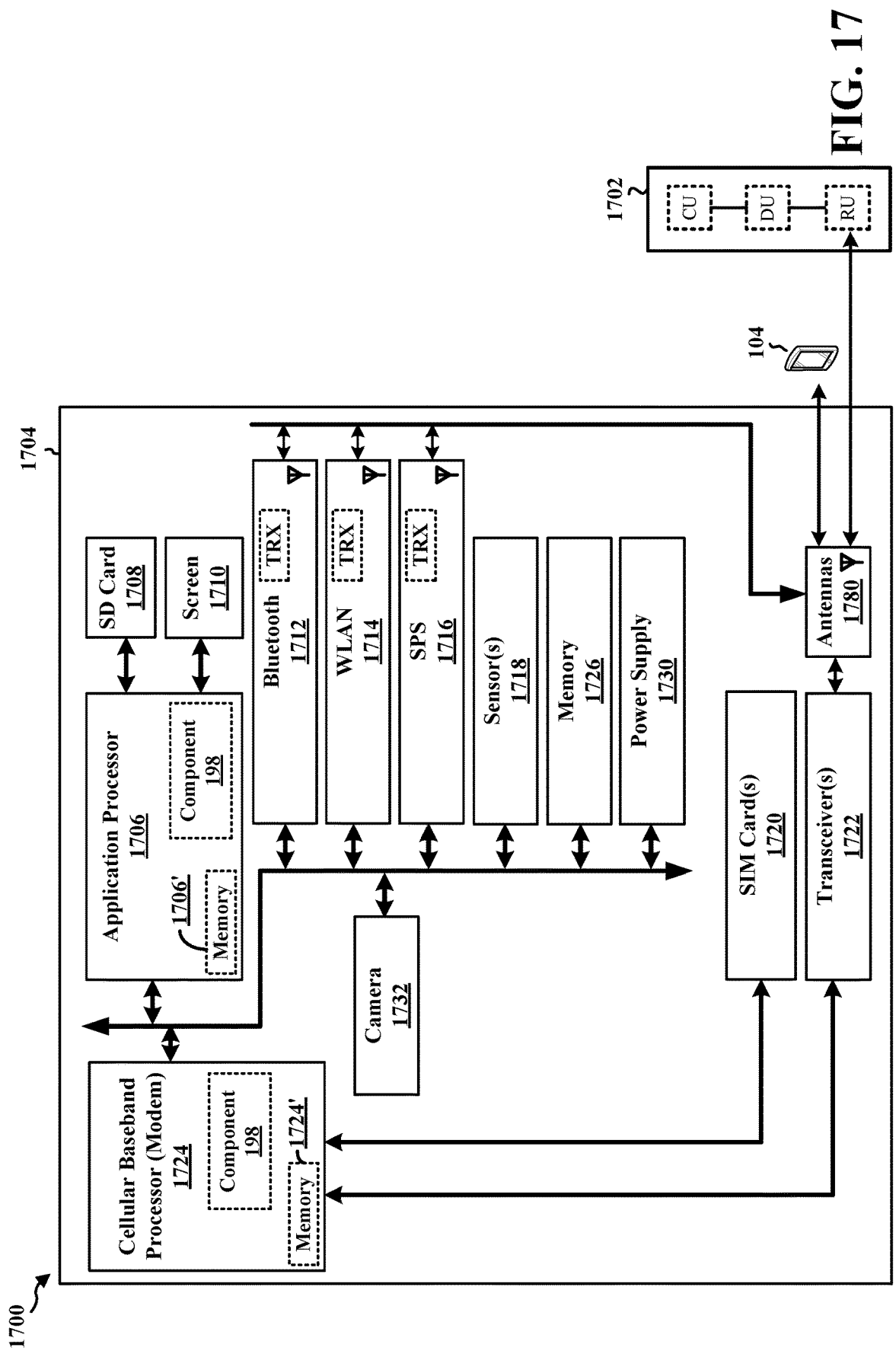
FIG. 17 is a diagram illustrating an example of a hardware implementation for an example apparatus and/or network entity, in accordance with various aspects of the present disclosure.

FIG. 17 is a diagram 1700 illustrating an example of a hardware implementation for an apparatus 1704, in accordance with various aspects of the present disclosure. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/ memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the component 198 is configured to receive a V2X message from a second UE. The V2X message may be a suspicious message. The V2X message may include a plurality of values. Each value in the plurality of values may correspond to a respective field in a plurality of fields. The component 198 may be configured to identify a health score associated with the V2X message. The component 198 may be configured to adjust at least one value in the plurality of values if the health score is greater than a threshold. The component 198 may be configured to receive a plurality of first V2X messages and a second V2X message. The second V2X message may be subsequent to the plurality of first V2X messages. The component 198 may be configured to identify the second V2X message as being suspicious based on the plurality of first V2X messages. The second V2X message may be inconsistent with the plurality of first V2X messages based on forecasting from the plurality of first V2X messages. The component 198 may be configured to receive a plurality of third V2X messages. The plurality of third V2X messages may be subsequent to the second V2X message. The plurality of third V2X messages may be consistent with each other based on forecasting from at least some third V2X messages in the plurality of third V2X messages. The component 198 may be configured to reevaluate the second V2X message based on backcasting from the plurality of third V2X messages. The component 198 may be configured to generate a report associated with the second V2X message based on the reevaluation of the second V2X message. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a V2X message from a second UE. The V2X message may be a suspicious message. The V2X message may include a plurality of values. Each value in the plurality of values may correspond to a respective field in a plurality of fields. The apparatus 1704, and in particular the cellular baseband processor 1724 and/or the application processor 1706, includes means for identifying a health score associated with the V2X message. The apparatus 1704, and in particular the cellular baseband processor 1724 and/or the application processor 1706, includes means for adjusting at least one value in the plurality of values if the health score is greater than a threshold.

In one configuration, apparatus 1704, and in particular the cellular baseband processor 1724 and/or the application processor 1706, includes means for discarding the V2X message if the health score is less than or equal to the threshold. In one configuration, apparatus 1704, and in particular the cellular baseband processor 1724 and/or the application processor 1706, includes means for transmitting the V2X message after adjusting the at least one value in the plurality of values. In one configuration, the V2X message may be transmitted to at least one of an LDM application or a V2X application. In one configuration, the means for adjusting the at least one value in the plurality of values may be further configured to correct the at least one value in the plurality of values if the health score is greater than the threshold. In one configuration, the means for identifying the health score associated with the V2X message may be further configured to: assess, for each value in the plurality of values, whether the value is healthy or not healthy, the plurality of values including a first set of values that are assessed as being healthy and a second set of values that are assessed as being not healthy; and aggregate one or more respective health score shares associated with the first set of values, each value in the plurality of values being associated with a respective predefined health score share, where the health score associated with the V2X message corresponds to a sum of the one or more respective health score shares associated with the first set of values. In one configuration, the plurality of values may be associated with equal predefined health score shares. In one configuration, the plurality of values may be associated with different predefined health score shares. In one configuration, each value in the second set of values may trigger a misbehavior detector. In one configuration, the means for adjusting the at least one value in the plurality of values may be further configured to replace the at least one value with a correct value. The at least one value may belong in the second set of values. The correct value may be a computed, measured, or prestored value.

In one configuration, the first UE may be a first vehicle UE. The second UE may be a second vehicle UE. In one configuration, the apparatus 1704, and in particular the cellular baseband processor 1724 and/or the application processor 1706, includes means for receiving a plurality of first V2X messages and a second V2X message. The second V2X message may be subsequent to the plurality of first V2X messages. The apparatus 1704, and in particular the cellular baseband processor 1724 and/or the application processor 1706, includes means for identifying the second V2X message as being suspicious based on the plurality of first V2X messages. The second V2X message may be inconsistent with the plurality of first V2X messages based on forecasting from the plurality of first V2X messages. The apparatus 1704, and in particular the cellular baseband processor 1724 and/or the application processor 1706, includes means for receiving a plurality of third V2X messages. The plurality of third V2X messages may be subsequent to the second V2X message. The plurality of third V2X messages may be consistent with each other based on forecasting from at least some third V2X messages in the plurality of third V2X messages. The apparatus 1704, and in particular the cellular baseband processor 1724 and/or the application processor 1706, includes means for reevaluating the second V2X message based on backcasting from the plurality of third V2X messages. The apparatus 1704, and in particular the cellular baseband processor 1724 and/or the application processor 1706, includes means for generating a report associated with the second V2X message based on the reevaluation of the second V2X message.

In one configuration, if the second V2X message is identified as being genuine based on the reevaluation of the second V2X message, the apparatus 1704, and in particular the cellular baseband processor 1724 and/or the application processor 1706, includes means for reevaluating at least some first V2X messages in the plurality of first V2X messages based on backcasting from the plurality of third V2X messages and the second V2X message. In one configuration, the apparatus 1704, and in particular the cellular baseband processor 1724 and/or the application processor 1706, includes means for transmitting the report associated with the second V2X message based on the reevaluation of the second V2X message. The report may be transmitted after generating the report. In one configuration, the UE may be a vehicle UE.

The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Referring back to FIGS. 4-11, in one or more aspects, a first UE may receive a V2X message from a second UE. The V2X message may be a suspicious message. The V2X message may include a plurality of values. Each value in the plurality of values may correspond to a respective field in a plurality of fields. The first UE may identify a health score associated with the V2X message. The first UE may adjust at least one value in the plurality of values if the health score is greater than a threshold. Accordingly, a health level of a suspicious V2X message may be analyzed quantitatively. A suspicious V2X message with a sufficiently low health level may be suppressed. Moreover, an attacker may spend more effort in order to cause an entire V2X message to be suppressed by the MBDS. Furthermore, a correctable field value in a suspicious V2X message may be corrected based on a computed, measured, or prestored value. In one or more further aspects, a UE may receive a plurality of first V2X messages and a second V2X message. The second V2X message may be subsequent to the plurality of first V2X messages. The UE may identify the second V2X message as being suspicious based on the plurality of first V2X messages. The second V2X message may be inconsistent with the plurality of first V2X messages based on forecasting from the plurality of first V2X messages. The UE may receive a plurality of third V2X messages. The plurality of third V2X messages may be subsequent to the second V2X message. The plurality of third V2X messages may be consistent with each other based on forecasting from at least some third V2X messages in the plurality of third V2X messages. The UE may reevaluate the second V2X message based on backcasting from the plurality of third V2X messages. The UE may generate a report associated with the second V2X message based on the reevaluation of the second V2X message. Accordingly, based on the backcasting process, the output of a forward forecast detector may be verified and/or improved. Further, a correct misbehavior report reflecting the actual genuineness status of the V2X messages may be generated and transmitted. In the event that the status indicated in a transmitted initial misbehavior report is found to be incorrect based on the backcasting process, a corrected misbehavior report indicating the updated, correct status of the V2X messages may be generated and transmitted.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE, including receiving a V2X message from a second UE, the V2X message being a suspicious message, the V2X message including a plurality of values, each value in the plurality of values corresponding to a respective field in a plurality of fields; identifying a health score associated with the V2X message; and adjusting at least one value in the plurality of values if the health score is greater than a threshold.

Aspect 2 is the method of aspect 1, further including: discarding the V2X message if the health score is less than or equal to the threshold.

Aspect 3 is the method of aspect 1, further including: transmitting the V2X message after adjusting the at least one value in the plurality of values.

Aspect 4 is the method of aspect 3, where the V2X message is transmitted to at least one of an LDM application or a V2X application.

Aspect 5 is the method of any of aspects 1, 3, and 4, where adjusting the at least one value in the plurality of values further includes: correcting the at least one value in the plurality of values if the health score is greater than the threshold.

Aspect 6 is the method of any of aspects 1 to 5, where identifying the health score associated with the V2X message further includes: assessing, for each value in the plurality of values, whether the value is healthy or not healthy, the plurality of values including a first set of values that are assessed as being healthy and a second set of values that are assessed as being not healthy; and aggregating one or more respective health score shares associated with the first set of values, each value in the plurality of values being associated with a respective predefined health score share, where the health score associated with the V2X message corresponds to a sum of the one or more respective health score shares associated with the first set of values.

Aspect 7 is the method of aspect 6, where the plurality of values is associated with equal predefined health score shares.

Aspect 8 is the method of aspect 6, where the plurality of values is associated with different predefined health score shares.

Aspect 9 is the method of any of aspects 6 to 8, where each value in the second set of values triggers a misbehavior detector.

Aspect 10 is the method of any of aspects 6 to 9, where adjusting the at least one value in the plurality of values further includes: replacing the at least one value with a correct value, the at least one value belonging in the second set of values, the correct value being a computed, measured, or prestored value.

Aspect 11 is the method of any of aspects 1 to 10, where the first UE is a first vehicle UE and the second UE is a second vehicle UE.

Aspect 12 is a method of wireless communication at a first UE, including receiving a plurality of first V2X messages and a second V2X message, the second V2X message being subsequent to the plurality of first V2X messages; identifying the second V2X message as being suspicious based on the plurality of first V2X messages, the second V2X message being inconsistent with the plurality of first V2X messages based on forecasting from the plurality of first V2X messages; receiving a plurality of third V2X messages, the plurality of third V2X messages being subsequent to the second V2X message, the plurality of third V2X messages being consistent with each other based on forecasting from at least some third V2X messages in the plurality of third V2X messages; reevaluating the second V2X message based on backcasting from the plurality of third V2X messages; and generating a report associated with the second V2X message based on the reevaluation of the second V2X message.

Aspect 13 is the method of aspect 12, where if the second V2X message is identified as being genuine based on the reevaluation of the second V2X message, the method further includes: reevaluating at least some first V2X messages in the plurality of first V2X messages based on backcasting from the plurality of third V2X messages and the second V2X message.

Aspect 14 is the method of any of aspects 12 and 13, further including: transmitting the report associated with the second V2X message based on the reevaluation of the second V2X message, where the report is transmitted after generating the report.

Aspect 15 is the method of any of aspects 12 to 14, where the UE is a vehicle UE.

Aspect 16 is an apparatus for wireless communication including at least one processor coupled to a memory and, based at least in part on information stored in the memory, the at least one processor is configured to implement a method as in any of aspects 1-15.

Aspect 17 may be combined with aspect 16 and further includes a transceiver coupled to the at least one processor.

Aspect 18 is an apparatus for graphics processing including means for implementing a method as in any of aspects 1-15.

Aspect 19 is a non-transitory computer-readable medium storing computer executable code, the code when executed by at least one processor causes the at least one processor to implement a method as in any of aspects 1-15.

Various aspects have been described herein. These and other aspects are within the scope of the following claims.

What is claimed is:
1. An apparatus for wireless communication, comprising:
a memory; and at least one processor coupled to the memory and, based at least in part on information stored in the memory, the at least one processor is configured to:
- receive a message, the message including a plurality of values;
- identify a health score associated with the message, wherein to identify the health score associated with the message, the at least one processor is configured to:
  - assess, for each value in the plurality of values, whether the value is healthy or not healthy, the plurality of values including a first set of values that are assessed as being healthy and a second set of values that are assessed as being not healthy; and
  - aggregate one or more respective health score shares associated with the first set of values, each value in the plurality of values being associated with a respective defined health score share based on a respective safety importance associated with the value, wherein the health score associated with the message corresponds to an aggregate of the one or more respective health score shares associated with the first set of values; and
- adjust at least one value in the plurality of values based on a comparison of the health score to a threshold.

2. The apparatus of claim 1, the at least one processor being further configured to:
- receive a second message;
- identify a second health score associated with the second message; and
- discard the second message based on a comparison of the second health score to the threshold.

3. The apparatus of claim 1, the at least one processor being further configured to:
- transmit the message after adjusting the at least one value in the plurality of values.

4. The apparatus of claim 3, wherein to transmit the message, the at least one processor is configured to transmit the message to at least one of a local dynamic map (LDM) application or a V2X application.

5. The apparatus of claim 1, wherein to adjust the at least one value in the plurality of values, the at least one processor is configured to:
- correct the at least one value in the plurality of values.

6. The apparatus of claim 1, wherein the plurality of values is associated with equal predefined health score shares.

7. The apparatus of claim 1, wherein the plurality of values is associated with different predefined health score shares.

8. The apparatus of claim 1, wherein each value in the second set of values triggers a misbehavior detector.

9. The apparatus of claim 1, wherein to adjust the at least one value in the plurality of values, the at least one processor is configured to:
replace the at least one value with a correct value, the at least one value belonging in the second set of values, the correct value being a computed, measured, or prestored value.

10. The apparatus of claim 1, wherein the apparatus is a first vehicle user equipment (UE), wherein to receive the message, the at least one processor is configured to receive the message from a second vehicle UE, and the message is a vehicle-to-everything (V2X) message.

11. The apparatus of claim 1, further comprising a transceiver coupled to the at least one processor.

12. A method of wireless communication at a first user equipment (UE), comprising:
- receiving a vehicle-to-everything (V2X) message from a second UE, the V2X message being a suspicious message, the V2X message including a plurality of values, each value in the plurality of values corresponding to a respective field in a plurality of fields;
- identifying a health score associated with the V2X message by:
  - assessing, for each value in the plurality of values, whether the value is healthy or not healthy, the plurality of values including a first set of values that are assessed as being healthy and a second set of values that are assessed as being not healthy; and
  - aggregating one or more respective health score shares associated with the first set of values, each value in the plurality of values being associated with a respective defined health score share based on a respective safety importance associated with the value, wherein the health score associated with the message corresponds to an aggregate of the one or more respective health score shares associated with the first set of values; and
- adjusting at least one value in the plurality of values if the health score is greater than a threshold.

13. The method of claim 12, further comprising:
discarding the V2X message if the health score is less than or equal to the threshold.

14. The method of claim 12, further comprising:
transmitting the V2X message after adjusting the at least one value in the plurality of values.

15. The method of claim 14, wherein the V2X message is transmitted to at least one of a local dynamic map (LDM) application or a V2X application.

16. The method of claim 12, wherein adjusting the at least one value in the plurality of values comprises:
correcting the at least one value in the plurality of values if the health score is greater than the threshold.

17. The method of claim 12, wherein the plurality of values is associated with equal predefined health score shares.

18. The method of claim 12, wherein the plurality of values is associated with different predefined health score shares.

19. The method of claim 12, wherein each value in the second set of values triggers a misbehavior detector.

* * * * *